United States Patent
Suzuki et al.

(10) Patent No.: US 11,417,219 B2
(45) Date of Patent: Aug. 16, 2022

(54) NON-TRANSITORY COMPUTER-READABLE STORAGE MEDIUM FOR STORING COLLISION RISK CALCULATION PROGRAM, COLLISION RISK CALCULATION METHOD, AND COLLISION RISK CALCULATION APPARATUS

(71) Applicant: FUJITSU LIMITED, Kawasaki (JP)

(72) Inventors: Hiroko Suzuki, Kawasaki (JP); Takahiro Saito, Asaka (JP); Isamu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 16/590,662

(22) Filed: Oct. 2, 2019

(65) Prior Publication Data
US 2020/0035106 A1    Jan. 30, 2020

Related U.S. Application Data

(63) Continuation of application No. PCT/JP2017/015950, filed on Apr. 20, 2017.

(51) Int. Cl.
*G08G 3/00* (2006.01)
*G08G 3/02* (2006.01)
(Continued)

(52) U.S. Cl.
CPC ............ *G08G 3/02* (2013.01); *G01C 21/20* (2013.01); *G01C 21/203* (2013.01); *B63B 22/18* (2013.01);
(Continued)

(58) Field of Classification Search
CPC .......... G01C 21/203; G08G 3/00; G08G 3/02; B63B 22/16; B63B 43/18; B63B 51/00;
(Continued)

(56) References Cited

U.S. PATENT DOCUMENTS

| 5,515,287 A * | 5/1996 | Hakoyama | G08G 3/02 701/301 |
| 7,580,790 B2 * | 8/2009 | Jansson | G01C 21/20 701/412 |

(Continued)

FOREIGN PATENT DOCUMENTS

| DE | 10115793 A1 * | 10/2002 | ............... G08G 3/02 |
| JP | H07-304495 A | 11/1995 | |

(Continued)

OTHER PUBLICATIONS

Understanding and mitigating the underlying acoustic causes for ship collisions with whales; E.R. Gerstein;S.E. Forsythe;J.E. Blue; Oceans 2003. Celebrating the Past . . . Teaming Toward the Future (IEEE Cat. No. 03CH37492); vol. 1; IEEE Conference Paper (Year: 2003).*

(Continued)

*Primary Examiner* — Cuong H Nguyen
(74) *Attorney, Agent, or Firm* — Fujitsu Patent Center

(57) ABSTRACT

A method for a collision risk calculation includes: executing acquisition processing that includes acquiring travel information regarding a position and velocity of each of a first vessel and a second vessel; executing region calculation processing that includes calculating a region having a possibility of future collision between the first vessel and the second vessel from the travel information of each of the first vessel and the second vessel; and executing first risk calculation processing that includes calculating a first risk value based on a maneuvering amount used by the first vessel or the second vessel in order to avoid the region.

15 Claims, 20 Drawing Sheets

(51) Int. Cl.
*G01C 21/20* (2006.01)
*H04W 4/02* (2018.01)
*B63B 22/18* (2006.01)
*B63B 45/00* (2006.01)
*H04W 4/024* (2018.01)

(52) U.S. Cl.
CPC ............. *B63B 45/00* (2013.01); *H04W 4/024* (2018.02); *H04W 4/027* (2013.01)

(58) Field of Classification Search
CPC ....... B63B 45/00; G01S 13/93; G01S 13/937; G61S 13/66; G61S 13/726; H04W 4/024; H04W 4/027
USPC .......................... 701/21, 301; 342/41, 46, 47
See application file for complete search history.

(56) References Cited

U.S. PATENT DOCUMENTS

| | | | | |
|---|---|---|---|---|
| 9,550,493 | B2* | 1/2017 | Ohsugi | B60W 10/18 |
| 9,731,716 | B2* | 8/2017 | Ohsugi | G05D 1/021 |
| 9,902,471 | B2* | 2/2018 | Hellesmark | B63B 27/25 |
| 9,969,329 | B2* | 5/2018 | Shenoy | G08G 1/164 |
| 10,019,903 | B2* | 7/2018 | Lee | G08G 1/162 |
| 10,317,513 | B2* | 6/2019 | Nakahama | G01S 7/10 |
| 10,351,129 | B2* | 7/2019 | Luo | B60W 40/04 |
| 10,386,856 | B2* | 8/2019 | Wood | B60W 60/001 |
| 10,421,436 | B2* | 9/2019 | Gage | G06V 20/56 |
| 10,431,099 | B2* | 10/2019 | Stewart | G01C 21/203 |
| 10,580,307 | B2* | 3/2020 | Yoshikawa | G01S 7/10 |
| 10,748,357 | B2* | 8/2020 | Nakayama | G01S 19/51 |
| 10,780,880 | B2* | 9/2020 | Wood | B60W 30/09 |
| 11,109,811 | B2* | 9/2021 | Nakayama | A61B 5/7278 |
| 11,158,190 | B2* | 10/2021 | Akachi | B60N 2/90 |
| 11,214,270 | B2* | 1/2022 | Omari | G05D 1/0212 |
| 2010/0284382 | A1* | 11/2010 | Stahlin | G08G 1/095 370/338 |
| 2011/0210865 | A1* | 9/2011 | Lee | G08G 3/02 340/903 |
| 2012/0034905 | A1* | 2/2012 | Stahlin | G08G 1/205 455/414.1 |
| 2012/0283895 | A1 | 11/2012 | Noda | |
| 2013/0147955 | A1* | 6/2013 | Oosugi | G08G 1/096716 348/148 |
| 2016/0125739 | A1* | 5/2016 | Stewart | G01C 21/203 701/21 |
| 2016/0163198 | A1* | 6/2016 | Dougherty | G08G 1/162 340/905 |
| 2016/0328118 | A1* | 11/2016 | Yoshikawa | G08G 3/02 |
| 2016/0361058 | A1* | 12/2016 | Bolduc | A61B 50/3001 |
| 2017/0039865 | A1 | 2/2017 | Takabayashi et al. | |
| 2017/0067984 | A1* | 3/2017 | Nakahama | G01S 13/937 |
| 2017/0162050 | A1* | 6/2017 | Chen | B60W 30/095 |

FOREIGN PATENT DOCUMENTS

| | | | | |
|---|---|---|---|---|
| JP | H11-272999 A | | 10/1999 | |
| JP | 2012-234407 | | 11/2012 | |
| JP | 2013-028296 A | | 2/2013 | |
| KR | 20130076047 A | * | 7/2013 | ............. G08B 23/00 |
| KR | 10-2014-0083677 | | 7/2014 | |
| WO | WO-9416972 A1 | * | 8/1994 | ................ B60P 3/22 |
| WO | WO-0172588 A1 | * | 10/2001 | ................ B64B 1/26 |
| WO | WO-2009123428 A2 | * | 10/2009 | ........... G04B 19/082 |
| WO | 2015/155874 A1 | | 10/2015 | |
| WO | WO-2018193596 A1 | * | 10/2018 | ............. G01C 21/20 |

OTHER PUBLICATIONS

Dynamic Position Predicting of Underactuated Surface Vessel with Unscented Kalman Filter; Zhijun Wang;Zongqiang Nie;Guanaming Sheng; 2018 Chinese Automation Congress (CAC); IEEE Conference Paper. (Year: 2018).*

An intelligent collision avoidance algorithm research; Xiao-ye Wang;Ru-jing Zheng;Ugur Simsir;Ying-yuan Xiao; 2016 9th International Congress on Image and Signal Processing, BioMedical Engineering and Informatics (CISP-BMEI); IEEE Conference Paper (Year: 2016).*

S. Hexeberg, A. L. Flåten, B.-O. H. Eriksen and E. F. Brekke, "AIS-based vessel trajectory prediction," 2017 20th International Conference on Information Fusion (Fusion), 2017, pp. 1-8, doi: 10.23919/ICIF.2017.8009762. (Year: 2017).*

J. Alonso-Mora, P. Beardsley and R. Siegwart, "Cooperative Collision Avoidance for Nonholonomic Robots," in IEEE Transactions on Robotics, vol. 34, No. 2, pp. 404-420, Apr. 2018, doi: 10.1109/TRO.2018.2793890. (Year: 2018).*

G. Pedrielli, Y. Xing, J. H. Peh, K. W. Koh and S. H. Ng, "A Real Time Simulation Optimization Framework for Vessel Collision Avoidance and the Case of Singapore Strait," in IEEE Trans. on Intelligent Transportation Systems, vol. 21, No. 3, pp. 1204-1215, Mar. 2020, doi: 10.1109/TITS.2019.2903824. (Year: 2020).*

B. Murray and L. P. Perera, "A Data-Driven Approach to Vessel Trajectory Prediction for Safe Autonomous Ship Operations," 2018 Thirteenth International Conference on Digital Information Management (ICDIM), 2018, pp. 240-247, doi: 10.1109/ICDIM.2018.8847003. (Year: 2018).*

JPOA—Office Action of Japanese Patent Application No. 2019-513175 dated Apr. 28, 2020 with Full Machine Translation.

EESR—Extended European Search Report dated Apr. 28, 2020 for European Patent Application No. 17906218.7.

Reference JP2013-028296 cited in the JPOA and EESR was previously submitted in the IDS filed on Oct. 2, 2019. .

International Search Report and Written Opinion of the International Searching Authority (Form PCT/ISA/210 and 237), mailed in connection with PCT/JP2017/015950 and dated Jul. 25, 2017 (7 pages).

EPOA—Office Action of European Patent Application No. 17906218.7 dated Sep. 29, 2021. ** Reference JP2013-028296 cited in the EPOA was previously submitted in the IDS filed on Oct. 2, 2019.

* cited by examiner

FIG. 3

| GRID ID | GRID RANGE |
|---|---|
| 1 | (xx,xx)、(xx,xx)、(xx,xx)、(xx,xx) |
| 2 | (xx,xx)、(xx,xx)、(xx,xx)、(xx,xx) |
| ⋮ | ⋮ |

| GRID ID | APPROACH ANGLE | EXIT ANGLE | VELOCITY DIFFERENCE | VESSEL ID |
|---|---|---|---|---|
| ... | | | | |
| (2,2) | 88 | 89 | Δ V1 | xxxxx1 |
| (2,2) | 90 | 89 | Δ V2 | xxxxx2 |
| (2,2) | 92 | 91 | Δ V3 | xxxxx3 |
| (2,2) | 93 | 93 | Δ V4 | xxxxx4 |
| ... | | | | |
| (2,2) | 265 | 266 | Δ V95 | xxxxx95 |
| (2,2) | 268 | 268 | Δ V96 | xxxxx96 |
| (2,2) | 270 | 269 | Δ V97 | xxxxx97 |
| (2,2) | 271 | 271 | Δ V98 | xxxxx98 |
| (2,2) | 271 | 272 | Δ V99 | xxxxx99 |
| ... | | | | |

| TIME | MMSI1 | MMSI2 | CIRCLE CENTER POINT (LATITUDE) | CIRCLE CENTER POINT (LONGITUDE) | CIRCLE RADIUS (m) 34 |
|---|---|---|---|---|---|
| 2013/1/10 2:40 | 371882000 | 431003153 | 140.040 | 36.026 | 129.640 |
| 2013/1/10 2:40 | 431003153 | 371882000 | 140.040 | 36.026 | 129.640 |
| 2013/1/10 2:40 | 371882000 | 431003153 | 139.989 | 35.919 | 129.640 |
| 2013/1/10 2:40 | 431003153 | 371882000 | 139.989 | 35.919 | 129.640 |
| 2013/1/10 2:40 | 371882000 | 431003153 | 139.967 | 35.870 | 129.640 |
| 2013/1/10 2:40 | 431003153 | 371882000 | 139.967 | 35.870 | 129.640 |
| 2013/1/10 2:40 | 371882000 | 431003153 | 139.937 | 35.802 | 129.640 |
| 2013/1/10 2:40 | 431003153 | 371882000 | 139.937 | 35.802 | 129.640 |
| 2013/1/10 2:40 | 371882000 | 431003153 | 139.921 | 35.757 | 129.640 |
| 2013/1/10 2:40 | 431003153 | 371882000 | 139.921 | 35.757 | 129.640 |
| 2013/1/10 2:40 | 371882000 | 431003153 | 139.903 | 35.705 | 129.640 |
| ... | ... | ... | ... | ... | ... |

FIG. 8A

| TIME | MMSI | INFORMATION REGARDING VESSEL 1 ⟨35 | | | | | |
|---|---|---|---|---|---|---|---|
| | | LATITUDE | LONGITUDE | SOG | COG | VESSEL LENGTH | VESSEL WIDTH |
| 2013/1/10 2:40 | 123456789 | 139.74 | 35.339 | 8.8556 | 19.478 | 96 | 15 |
| 2013/1/10 2:40 | 123456789 | 139.74 | 35.339 | 8.8556 | 19.478 | 96 | 15 |
| 2013/1/10 2:40 | 123456789 | 139.74 | 35.339 | 8.8556 | 19.478 | 96 | 15 |
| 2013/1/10 2:40 | 123456789 | 139.64 | 35.388 | 6.9778 | 26.811 | 74 | 12 |
| 2013/1/10 2:40 | 123456789 | 139.64 | 35.388 | 6.9778 | 26.811 | 74 | 12 |
| 2013/1/10 2:40 | 123456789 | 139.64 | 35.388 | 6.9778 | 26.811 | 74 | 12 |
| 2013/1/10 2:40 | 234567890 | 139.92 | 35.491 | 10.345 | 287.57 | 276 | 44 |
| 2013/1/10 2:40 | 234567890 | 139.92 | 35.491 | 10.345 | 287.57 | 276 | 44 |
| 2013/1/10 2:40 | 234567890 | 139.92 | 35.491 | 10.345 | 287.57 | 276 | 44 |
| 2013/1/10 2:40 | 234567890 | 139.83 | 35.556 | 13.8 | 127 | 285 | 40 |
| 2013/1/10 2:40 | 234567890 | 139.83 | 35.556 | 13.8 | 127 | 285 | 40 |
| ... | ... | ... | ... | ... | ... | ... | ... |

FIG. 8B

| MMSI | INFORMATION REGARDING VESSEL 2 | | | | | | RISK VALUE 1 | RISK VALUE 2 | TOTAL RISK VALUE |
|---|---|---|---|---|---|---|---|---|---|
| | LATITUDE | LONGITUDE | SOG | COG | VESSEL LENGTH | VESSEL WIDTH | | | |
| 456789012 | 139.64 | 35.388 | 6.9778 | 26.811 | 74 | 12 | r011 | r012 | R011 |
| 567890123 | 139.92 | 35.491 | 10.345 | 287.57 | 276 | 44 | r021 | r022 | R012 |
| 789012345 | 139.83 | 35.556 | 13.8 | 127 | 285 | 40 | r031 | r032 | R013 |
| 678901234 | 139.74 | 35.339 | 8.8556 | 19.478 | 96 | 15 | r041 | r042 | R014 |
| 567890123 | 139.92 | 35.491 | 10.345 | 287.57 | 276 | 44 | r051 | r052 | R015 |
| 789012345 | 139.83 | 35.556 | 13.8 | 127 | 285 | 40 | r061 | r062 | R016 |
| 678901234 | 139.74 | 35.339 | 8.8556 | 19.478 | 96 | 15 | r071 | r072 | R017 |
| 456789012 | 139.64 | 35.388 | 6.9778 | 26.811 | 74 | 12 | r081 | r082 | R018 |
| 789012345 | 139.83 | 35.556 | 13.8 | 127 | 285 | 40 | r091 | r092 | R019 |
| 678901234 | 139.74 | 35.339 | 8.8556 | 19.478 | 96 | 15 | r101 | r102 | R020 |
| 456789012 | 139.64 | 35.388 | 6.9778 | 26.811 | 74 | 12 | r111 | r112 | R21 |
| ... | ... | ... | ... | ... | ... | ... | ... | ... | ... |

NON-TRANSITORY COMPUTER-READABLE STORAGE MEDIUM FOR STORING COLLISION RISK CALCULATION PROGRAM, COLLISION RISK CALCULATION METHOD, AND COLLISION RISK CALCULATION APPARATUS

CROSS-REFERENCE TO RELATED APPLICATION

This application is a continuation application of International Application PCT/JP2017/015950 filed on Apr. 20, 2017 and designated the U.S., the entire contents of which are incorporated herein by reference.

FIELD

The present invention relates to a non-transitory computer-readable storage medium storing a collision risk calculation program, a collision risk calculation method, and a collision risk calculation apparatus.

BACKGROUND

Conventionally, there are various methods for calculating a collision risk in navigation of a vessel using Automatic Identification System (AIS) data transmitted from an AIS mounted on the vessel. Moreover, there is a technology that visualizes and displays collision risk calculated by various methods in a graph or the like so as to allow intuitive recognition of the collision risk in the navigation of vessels.

Examples of the related art include Japanese Laid-open Patent Publication No. 11-272999.

SUMMARY

According to an aspect of the embodiments, a method performed by a computer for a collision risk calculation includes: executing acquisition processing that includes acquiring travel information regarding a position and velocity of each of a first vessel and a second vessel; executing region calculation processing that includes calculating a region having a possibility of future collision between the first vessel and the second vessel from the travel information of each of the first vessel and the second vessel; and executing first risk calculation processing that includes calculating a first risk value based on a maneuvering amount used by the first vessel or the second vessel in order to avoid the region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating an exemplary data configuration of grid information according to an embodiment.

FIG. 4 is a diagram illustrating an exemplary data configuration of past track information according to an embodiment.

FIG. 6 is a diagram illustrating an example of data indicating an exemplary data configuration of dangerous region information indicating OZT according to an embodiment.

FIGS. 8A and 8B are diagrams illustrating an example of risk calculation result information according to an embodiment.

DESCRIPTION OF EMBODIMENTS

Collision risks represented as geometrical regions are useful in intuitively recognizing collision risks in the navigation of vessels among the collision risks calculated by the various methods described above. However, this method has a problem that it is difficult to quantitatively grasp the degree of collision risk. For example, the collision risk represented as a geometrical region can be intuitively grasped from the viewpoint of the vessel maneuvering side in how to maneuver for collision avoidance. On the other hand, from the viewpoint of navigation control side, the collision risk represented as a geometrical region cannot be quantitatively grasped even though the existence of the sea area including the collision can be grasped.

In one aspect, the present invention aims to provide a collision risk calculation program, a collision risk calculation method, and a collision risk calculation device capable of quantitatively grasping the collision risk represented as a geometrical region.

According to one embodiment of the present invention, it is possible to quantitatively grasp the collision risk represented as a geometrical region.

Hereinafter, embodiments of a collision risk calculation program, a collision risk calculation method, and a collision risk calculation device according to the disclosed technology will be described in detail with reference to the drawings. Note that the present invention is not limited to the following embodiments. Each of the embodiments can be suitably combined within a range without causing contradiction between individual processing. In the following embodiments, the disclosed technology will be described in an exemplary case where the technology is applied to a support system for supporting navigation of a vessel. Note that in the following embodiments, each of "risk", "risk value", "collision risk", and "collision risk value" indicates the degree of possibility of collision in a predetermined time when vessels navigating in a target sea area of the navigation control continue taking a path and velocity at a certain time. The "time" includes date information and time information.

EMBODIMENTS

<Configuration of Support System>

Figure 1:
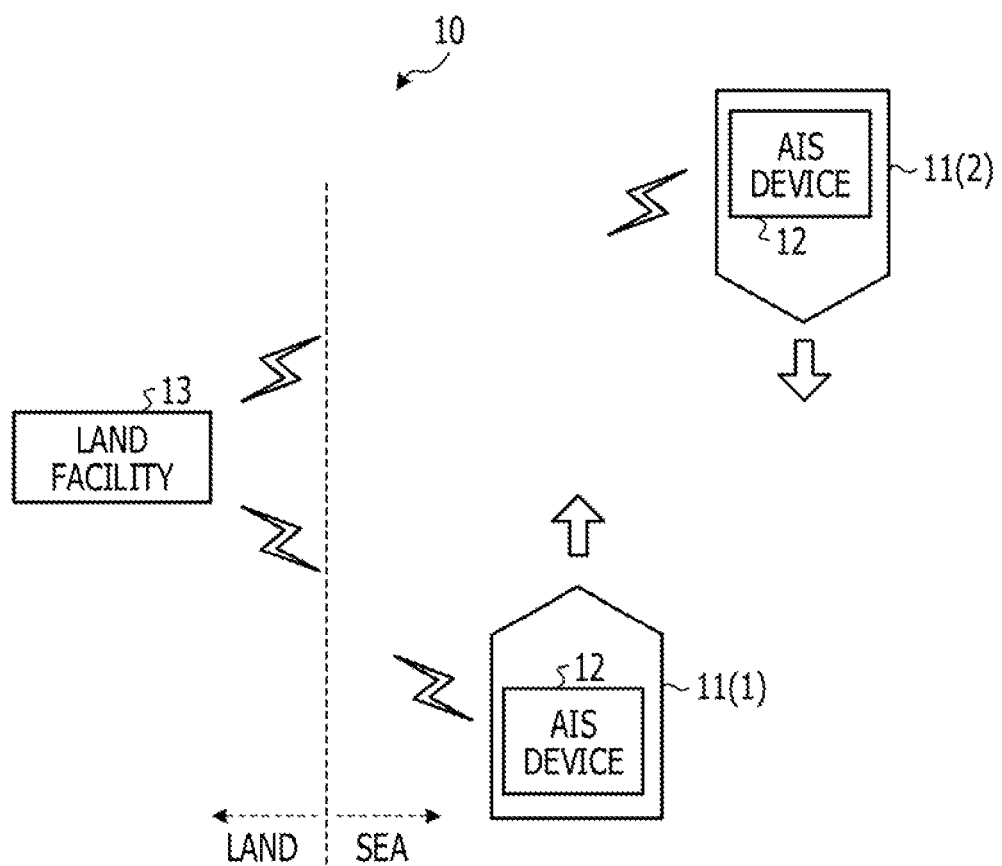
FIG. 1 is a diagram illustrating an example of a schematic configuration of a support system according to an embodiment.

First, an example of a support system 10 according to an embodiment will be described. FIG. 1 is a diagram illustrating an example of a schematic configuration of a support system. The support system 10 is a marine traffic control system that supports navigation of a vessel.

FIG. 1 illustrates two vessels 11 (vessel 1 (own vessel) and vessel 2 (target vessel)), and a land facility 13. Note that the vessel 1 (own vessel) and the vessel 2 (target vessel) only represents a relative relationship. When viewing the vessel 1 (own vessel) from the vessel 2 (target vessel), the vessel 2 is the own vessel and the vessel 1 is the target vessel.

Each of the vessels 11 is equipped with an Automatic Identification System (AIS) device 12. For example, specific vessels are required to be equipped with the AIS device 12 by a law or the like. Specific vessels are all vessels with 300 gross tons or more engaged in international voyages, all passenger ships engaged in international voyages, and all vessels with 500 gross tons or more not engaged in international voyages. Note that vessels other than specific vessels may also be equipped with the AIS device 12.

The AIS device 12 periodically transmits, by wireless communication, AIS information including various types of information related to the vessel 11 equipped with the AIS device 12. Examples of the AIS information include information such as position in latitude and longitude, velocity, vessel name, time, bow direction, Maritime Mobile Service Identity (MMSI), vessel length, and vessel width. The AIS information is received by another vessel 11 or the land facility 13. The AIS information enables the other vessels 11 and the land facility 13 to grasp various types of information such as the position, velocity, vessel name, time, bow direction, MMSI, vessel length, vessel width related to the vessel 11 which is a transmitting source of the received AIS information.

The land facility 13 is a facility that performs navigation control of each of the vessels 11. Examples of this facility include a marine traffic center, a port traffic control room, or the like, in charge of monitoring and providing information regarding vessels on the sea. The land facility 13 grasps the position of each of the vessels 11 on the basis of the AIS information received from each of the vessels 11, information detected by radar, or the like, and provides each of the vessels 11 with various types of information related to marine traffic.

<Configuration of Collision Risk Calculation Device>

Figure 2:
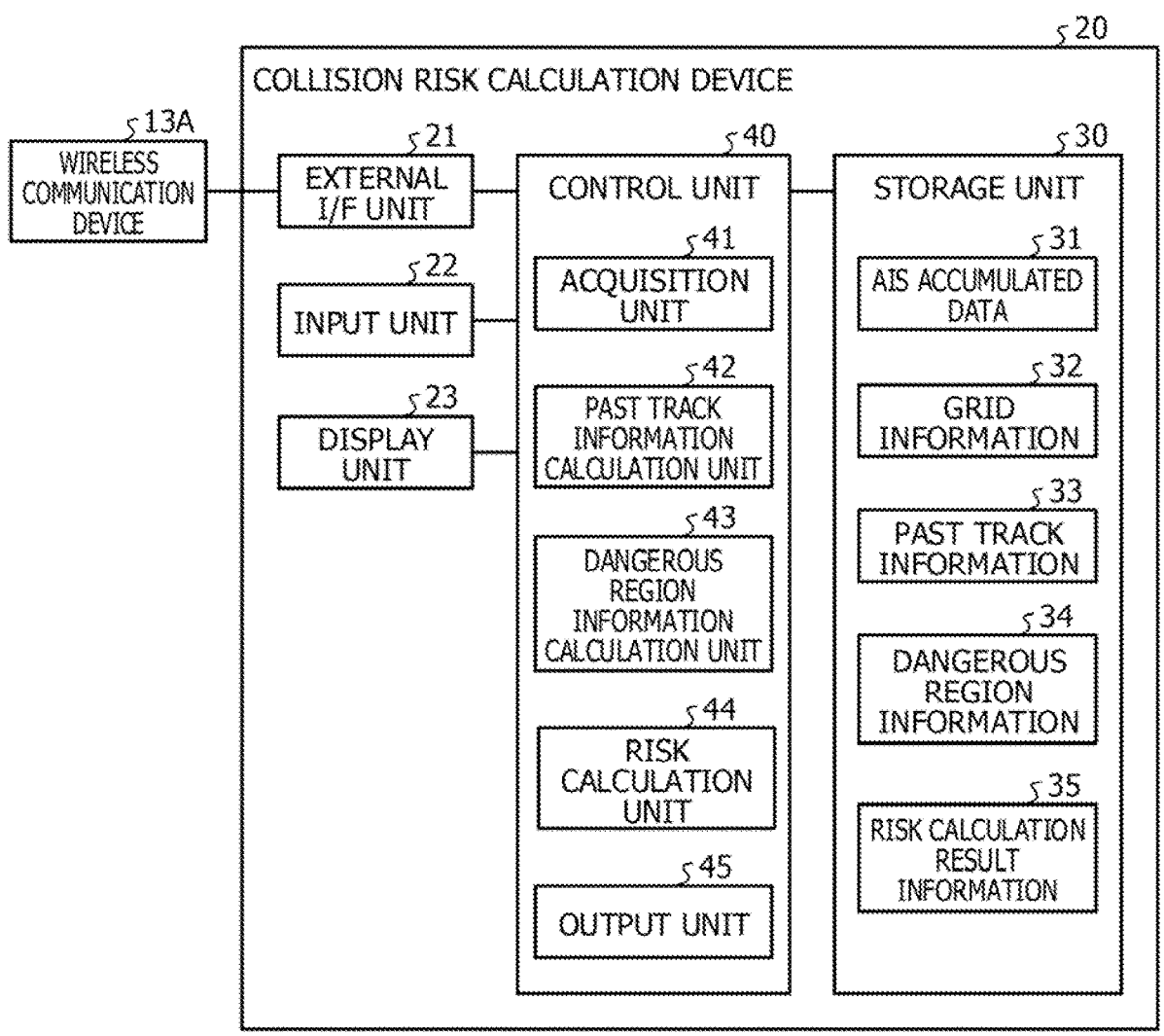
FIG. 2 is a diagram illustrating an example of a schematic configuration of a collision risk calculation device according to an embodiment.

Next, a configuration of a collision risk calculation device 20 according to an embodiment will be described. FIG. 2 is a diagram illustrating an example of a schematic configuration of the collision risk calculation device. The collision risk calculation device 20 is provided at the land facility 13 and configured to support navigation of a vessel. For example, the collision risk calculation device 20 is mounted on a computer device such as a server disposed in the land facility 13.

The collision risk calculation device 20 includes an external I/F (interface) unit 21, an input unit 22, a display unit 23, a storage unit 30, and a control unit 40.

The external I/F unit 21 is an interface that transmits and receives various types of information to and from other devices, for example. The external I/F unit 21 can wirelessly communicate with each of the vessels 11 via a wireless communication device 13A such as an antenna provided in the land facility 13, and transmits and receives various types of information to and from each of the vessels 11. For example, the external I/F unit 21 receives AIS information from each of the vessels 11 via the wireless communication device 13A.

The input unit 22 is an input device for inputting various types of information. The input unit 22 includes an input device that receives an input of operation made by a mouse, a keyboard, or the like. The input unit 22 receives input of various types of information. For example, the input unit 22 receives an operation input instructing to start various types of processing. The input unit 22 inputs operation information representing received operation content to the control unit 40.

The display unit 23 is a display device that displays various types of information. Examples of the display unit 23 include display devices such as a liquid crystal display (LCD) and a cathode ray tube (CRT). The display unit 23 displays various types of information. For example, the display unit 23 displays various screens such as an operation screen.

The storage unit 30 is an external storage device such as a hard disk drive (HDD), a solid state drive (SSD), or an optical or magneto-optical disk. Note that the storage unit 30 may be a semiconductor memory capable of rewriting data such as a random access memory (RAM), a flash memory, and a non-volatile static random access memory (NVSRAM).

The storage unit 30 stores an operating system (OS) and various programs executed by the control unit 40. For example, the storage unit 30 stores a program for executing past track information tabulation processing and collision risk calculation processing described below. Furthermore, the storage unit 30 stores various data used in a program executed by the control unit 40. For example, the storage unit 30 stores AIS accumulated data 31, grid information 32, past track information 33, dangerous region information 34, and risk calculation result information 35. Each of the AIS accumulated data 31, the grid information 32, the past track information 33, the dangerous region information 34, and the risk calculation result information 35 has a data format as a table, as an example. The present invention, however, is not limited to this format, and each of the AIS accumulated data 31, the grid information 32, the past track information 33, the dangerous region information 34, and the risk calculation result information 35 may be in other data format such as a Comma Separated Values (CSV) format.

The AIS accumulated data 31 is data obtained by accumulating AIS information received from each of the vessels 11. The grid information 32 represents data storing various types of information related to a grid obtained by dividing a navigation control target sea area by the land facility 13 into grids of a predetermined size. For example, the grid information 32 stores identification information for identifying the grid, and grid region boundary position information.

FIG. 3 is a view illustrating an exemplary data configuration of grid information according to an embodiment. As illustrated in FIG. 3, the grid information 32 includes items such as "grid ID" and "grid range". Note that each of the items of the grid information 32 illustrated in FIG. 3 is an example, and other items may be included.

The "grid ID" is a region for storing identification information for identifying a grid. The grid identifier (ID) is assigned as identification information to each of the grids for identifying each of the grids. The "grid ID" stores the grid ID assigned to the grid. The "grid range" is a region for storing the latitude and longitude of the position of each of vertices of the region of the grid.

Here, the size of the grid will be described. In the case of vessels, avoidance behavior to avoid a collision may be manifested as turning for at least about 30 seconds or more. For example, the collision risk, which will be described below, is evaluated in 10 seconds, having a high possibility to be able to grasp the change in risk. Assuming that the general navigation velocity of the vessel is about 10 to 12 [kn (knot)], the navigation distance in 10 seconds would be about 50 to 60 [m]. In the present embodiment, in order to stably evaluate the collision risk, the size of the grid is determined so as to be able to avoid positioning the vessel in the non-adjacent grid when the position of the vessel is determined in a period of evaluating the collision risk. For example, the grid is a rectangular region with a side wide of 100 [m] at minimum. Note that the grid may have a side width of 100 to 200 [m]. Furthermore, the shape of the grid is not limited to a rectangle. For example, the shape may be a polygon such as a triangle or a hexagon. Moreover, the target range may be divided into grids by combining a plurality of polygons.

<Past Track Information>

FIG. 4 is a diagram illustrating an exemplary data configuration of past track information according to an embodiment. The past track information 33 represents data storing various types of information related to vessels that have passed through each of the grids. As illustrated in FIG. 4, the past track information 33 has items such as "grid ID", "approach angle", "exit angle", "velocity difference", and "vessel ID". Note that each of the items of the past track information 33 illustrated in FIG. 4 is an example, and other items may be included.

The "grid ID" is a region for storing a grid ID of a grid. The "approach angle" is a region for storing approach angles of vessels that have passed through a grid, to the grid. The "exit angle" is a region for storing the exit angle of vessels that have passed through a grid, from the grid. The "velocity difference" is a difference between the velocity of a vessel when the vessel approaches each of grids and the velocity of the vessel when the vessel exits the grid.

The "approach angle" and the "exit angle" are angles based on a predetermined direction (0 degree). For example, the "approach angle" and "exit angle" are angles defined clockwise with respect to the north direction. Note that the "exit angle" may be an angle at which the vessel has left the grid, or may use an angle difference of the angle at which the vessel has left the grid with respect to the "approach angle". The "vessel ID" is a region for storing identification information for identifying a vessel. The "vessel ID" stores the MMSI of the vessel that has passed through the grid at "approach angle", "exit angle", and "velocity difference".

<Dangerous Region Information>

FIG. 6 is a view illustrating an example of data representing an exemplary data configuration of dangerous region information depicting OZT according to an embodiment. OZT, an abbreviation of Obstacle Zone by Target, is an index that uses a circle to geometrically indicate a vessel collision dangerous region. As illustrated in FIG. 6, the dangerous region information 34 includes items such as "time", "MMSI 1", "MMSI 2", "circle center point (latitude)", "circle center point (longitude)", and "circle radius (m)". Note that each of the items of the dangerous region information 34 illustrated in FIG. 6 is an example, and other items may be included.

The "time" indicates the time at which a dangerous region corresponding to a vessel 1 (own vessel) specified by "MMSI 1" and a vessel 2 (target vessel) specified by "MMSI 2" comes to have the "circle center point (latitude)", the "circle center point (longitude)" and the "circle radius (m)".

The dangerous region information 34 illustrated in FIG. 6 includes the positions, at each of the times, of the vessel 1 of the MMSI 1 and the vessel 2 of the MMSI 2 included in the AIS information received by the land facility 13 from each of the vessels 11 navigating the navigation control target sea area. The dangerous region information 34 indicates a region in which a possibility of collision between the two vessels after passage of a predetermined time is higher than a predetermined value of possibility when the vessel 1 and the vessel 2 continue taking the course and the velocity at each of times using a circle having a "circle radius (m)" centered on a "circle center point (latitude)" and a "circle center point (longitude)". Here, "each of times" is information complemented at one second intervals. Alternatively, "each of times" may be information updated every second, for example. In addition, "after a predetermined time from each of times" is after five minutes, for example.

<Display of OZT>

Figure 7:
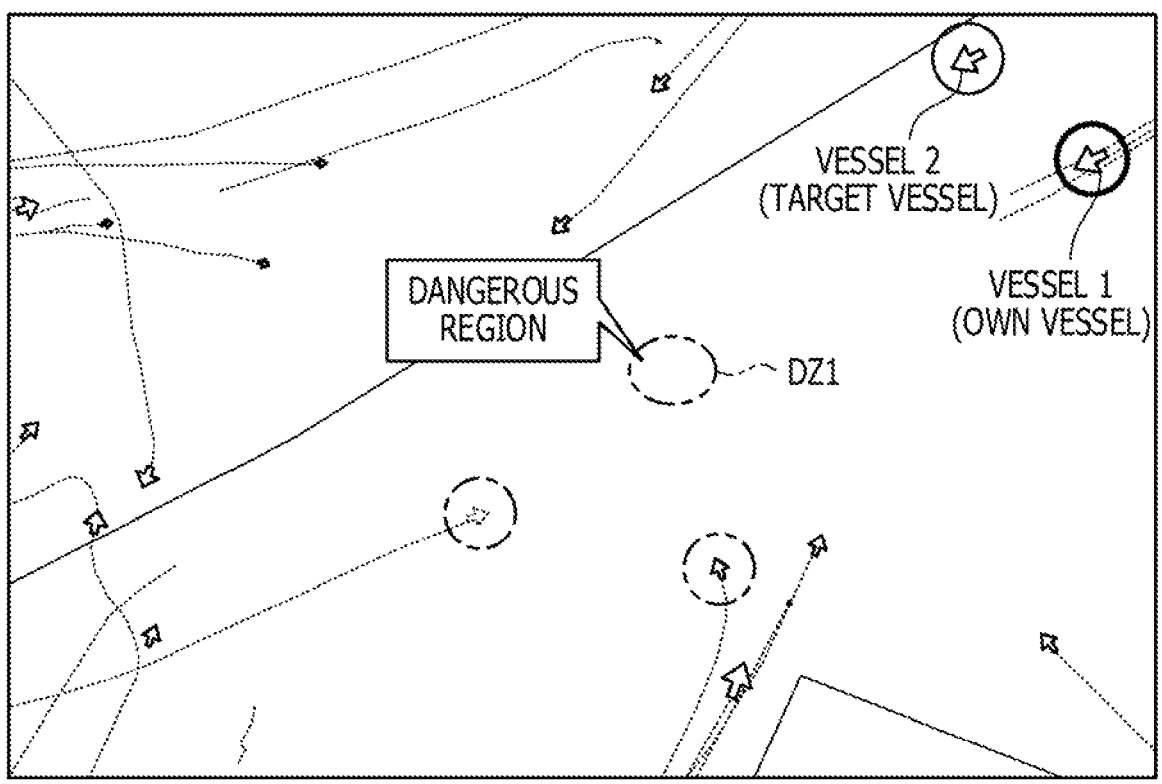
FIG. 7 is a view illustrating an example of display of OZT according to an embodiment.

FIG. 7 is a view illustrating an example of display of OZT according to an embodiment. FIG. 7 visually displays the dangerous region information 34 illustrated in FIG. 6. For example, as illustrated in FIG. 7, a region in which a possibility of collision between two vessels after five minutes, for example, becomes a threshold or more, when the vessel 1 and the vessel 2 continue taking the current course and velocity is represented by a dangerous region DZ1 in a circle. Although FIG. 7 illustrates only one dangerous region DZ1, the number of the dangerous regions DZ1 is not limited to this, and the dangerous region DZ1 may be more than one depending on the number of vessels navigating the navigation control target sea area.

<Risk Calculation Result Information>

FIGS. 8A and 8B are diagrams illustrating an example of risk calculation result information according to an embodiment. As illustrated in FIGS. 8A and 8B, the risk calculation result information 35 includes items such as "time", "information regarding vessel 1", "information regarding vessel 2", "risk value 1", "risk value 2" and "total risk value". Note that each of the items of the risk calculation result information 35 illustrated in FIGS. 8A and 8B is an example, and other items may be included.

The "information regarding the vessel 1" and the "information regarding the vessel 2" are based on AIS information received from the vessel 1 and the vessel 2, respectively. For example, the "information regarding the vessel 1" includes information related to the vessel 1, such as "MMSI", "latitude", "longitude", "SOG", "COG", "vessel length", and "vessel width".

The "MMSI" related to the vessel 1 is the MMSI of the vessel 1 at "time" associated in the risk calculation result information 35. "Latitude" and "longitude" related to the vessel 1 respectively correspond to latitude information and longitude information indicating the position of the vessel 1 at "time" associated in the risk calculation result information 35. "SOG" related to the vessel 1 is a Speed Over Ground of the vessel 1 at "time" associated in the risk calculation result information 35. "COG" related to the vessel 1 is a Course Over Ground of the vessel 1 at "time" associated in the risk calculation result information 35. The "vessel length" of the vessel 1 is the maximum length of the vessel 1. The "vessel width" of the vessel 1 is the maximum width of the vessel 1. In addition, in FIGS. 8A and 8B, the "information regarding the vessel 2" is similar to the "information regarding the vessel 1".

The "risk value 1" in the risk calculation result information 35 is a numerical risk value representing the collision risk of the vessel 1 and the vessel 2 in a numerical form. Examples of numerical risk values that can be expressed in continuous numerical form include Distance to Closest Point of Approach (DCPA), Time to Closest Point of Approach (TCPA), and the like. In addition, numerical risk values that can be expressed in a continuous or discrete numerical form include RiskLevel and the like, for example. "Risk value 1" in the risk calculation result information 35 includes one or more risk values out of numerical risk values representing the collision risk of the vessel 1 and the vessel 2 in a numerical form. For example, in FIGS. 8A and 8B, the "risk value 1" corresponding to the line of "time" "2013/1/10" in the first line is "r011". "Risk value 1" is an example of a second risk value.

The "risk value 2" in the risk calculation result information 35 is a region-type risk value representing the collision risk of the vessel 1 and the vessel 2 in a geometrical form. The region-type risk value includes an Obstacle Zone by Target (OZT), a Collision Danger Line (CDL), and the like. The OZT is a method of calculating the dangerous region of a circle based on the simultaneous existence probability of two vessels. In the present embodiment, "risk value 2" is assumed to be an OZT. For example, in FIGS. 8A and 8B, the "risk value 2" corresponding to the line of "time" "2013/1/10" in the first line is "r012". "Risk value 2" is an example of a first risk value.

Here, "risk value 2" is a risk value originally expressed in a geometrical form, but now is a risk value converted into a numerical form. There are, for example, the following conversion methods 1 to 3 as conversion methods for converting risk values expressed in geometrical form into risk values expressed in a numerical form. The present embodiment uses a result obtained by weighting any one or two or more of the conversion methods 1 to 3. The conversion methods 1 to 3 will be described below.

Note that since each of "risk value 1" and "risk value 2" takes various possible value range, the possible value range (for example, lower limit value and upper limit value such as 0 or more and 1 or less) may preferably be defined by normalization beforehand. Furthermore, the "total risk value" in the risk calculation result information 35 is a risk value obtained by weighting one or more "risk values 1" and one or more "risk values 2". For example, in FIGS. 8A and 8B, the "total risk value" corresponding to the line of "time" "2013/1/10" in the first line is "R011". The "total risk value" is an example of a third risk value.

Note that each of the following methods can be used for weighting at the time of calculating "risk value 1", "risk value 2", and "total risk value". The first method uses a simple average with uniform weights. The second method is ensemble learning of manually adding a weight to match a correct answer using a method such as multivariate analysis (such as multiple regression analysis) or machine learning when there is correct data of subjective risk values. The third method is an unsupervised machine learning method (such as clustering) when there is no correct data.

In this manner, after a region-type risk value expressed in the form of a geometrical region (for example, a dangerous region having a collision risk) is converted into a risk value expressed in the numerical form, a "total risk value" weighted together with the numerical risk value expressed in the numerical form is to be used as a vessel collision risk value. This makes it possible to obtain a risk value with higher accuracy having the features of the numerical risk value and the region-type risk value.

<First Conversion Method>

Figure 9:
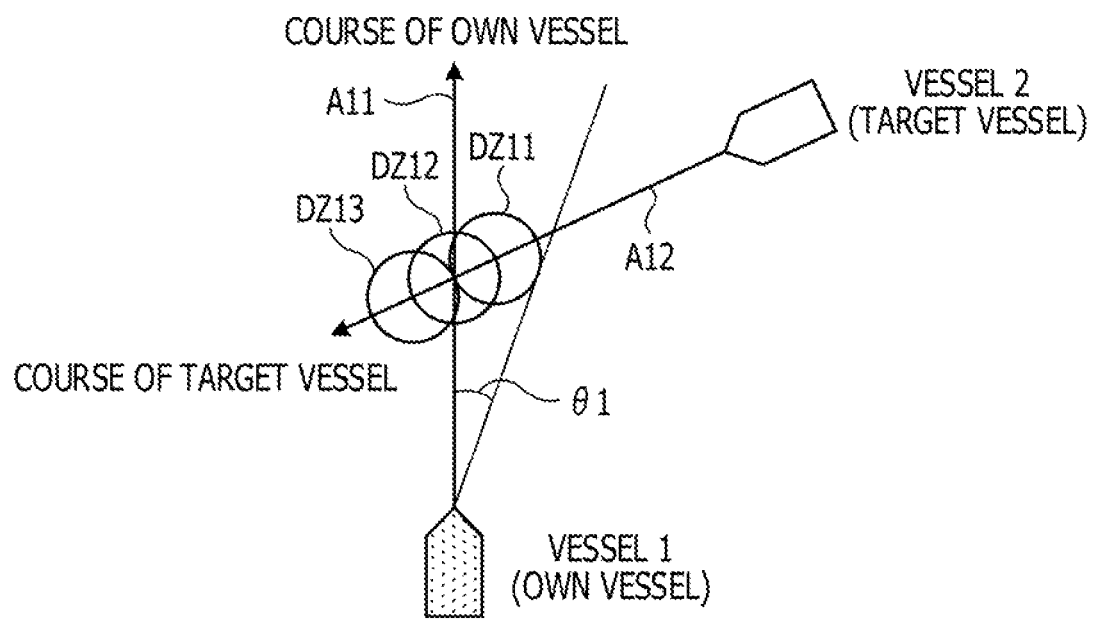
FIG. 9 is a view illustrating a first conversion method of the region-type risk value in OZT according to an embodiment.

FIG. 9 is a view illustrating a first conversion method of the region-type risk value in an OZT according to an embodiment. The risk calculation unit 44 generates an estimated future route of the vessel 1 (own vessel) at each of times, as indicated by a velocity vector A11 in FIG. 9. Similarly, the risk calculation unit 44 creates an estimated future route of the vessel 2 (target vessel), as indicated by a velocity vector A12 in FIG. 9. Subsequently, the risk calculation unit 44 calculates a dangerous region for the combination of the vessel 1 (own vessel) and the vessel 2 (target vessel). In the example illustrated in FIG. 9, three dangerous regions, that is, dangerous regions DZ11, DZ12, and DZ13, are calculated. In order to avoid the dangerous regions DZ11, DZ12, and DZ13, the risk calculation unit 44 calculates a minimum turning angle θ1 with respect to the current course taken by the vessel 1 (own vessel). In the first conversion method, the minimum turning angle θ1 is the risk value after conversion. The minimum turning angle θ1 is normalized as a maximum of 180°. The minimum turning angle θ1 has a feature that the vessel 2 (target vessel) crossing the vessel 1 (own vessel) at a closer point has a larger angle than the vessel 2 (target vessel) crossing the vessel 1 (own vessel) at a distant point and thus determined to have a higher risk. The minimum turning angle θ1 is an example of the maneuvering amount. Note that in FIG. 9, the minimum turning angle θ1 is a right turning angle, but may be a left turning angle, or either one angle being a minimum angle among the right turning angle and the left turning angle.

<Second Conversion Method>

Figure 10:
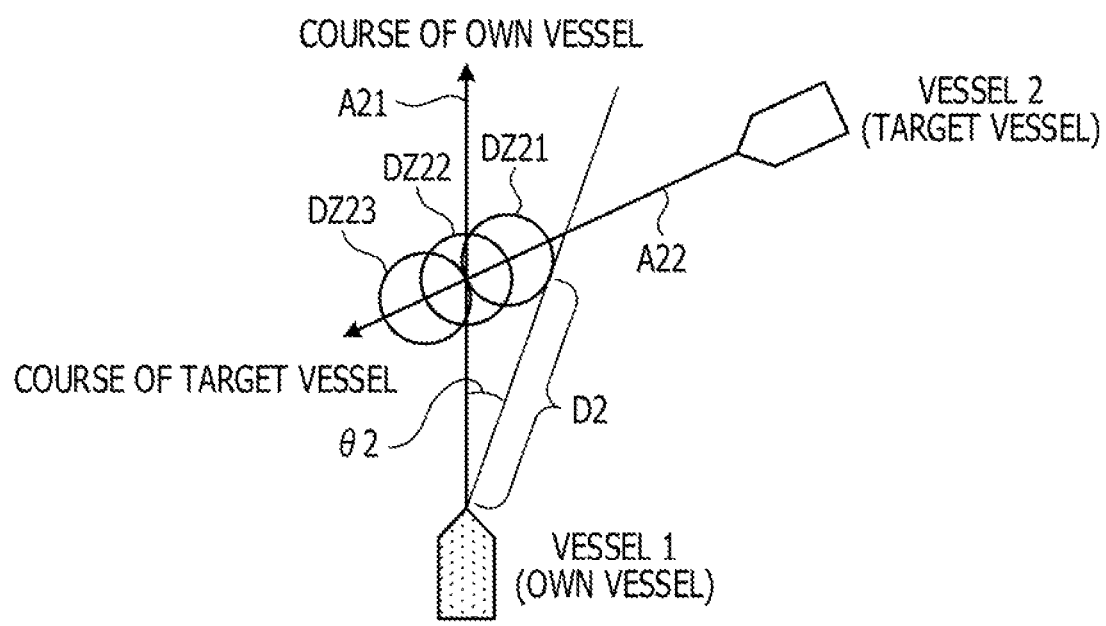
FIG. 10 is a view illustrating a second conversion method of the region-type risk value in OZT according to an embodiment.

FIG. 10 is a view illustrating a second conversion method of the region-type risk value in the OZT according to an embodiment. Similarly to the first conversion method, the risk calculation unit 44 creates an estimated future route of the vessel 1 (own vessel) at each of times, as indicated by a velocity vector A21 in FIG. 10. Similarly, the risk calculation unit 44 creates an estimated future route of the vessel 2 (target vessel), as indicated by a velocity vector A22 in FIG. 10. Subsequently, the risk calculation unit 44 calculates a dangerous region for the combination of the vessel 1 (own vessel) and the vessel 2 (target vessel). In the example illustrated in FIG. 10, three dangerous regions, that is, dangerous regions DZ21, DZ22 and DZ23, are calculated. In order to avoid the dangerous regions DZ21, DZ22, and DZ23, the risk calculation unit 44 calculates a minimum turning angle θ2 with respect to the current course taken by the vessel 1 (own vessel). A distance to dangerous region DZ21, DZ22, and DZ23 is set to a distance D2 from a contact point of the tangent connecting the vessel 1 (own vessel) with the dangerous region DZ21, to the vessel 1 (own vessel). Subsequently, time T2 taken to travel the distance D2 at the velocity of the vessel 1 (own vessel) at each of times is calculated. In the second conversion method, a risk value θ2/T2 obtained by dividing the minimum turning angle θ2 by the time T2 is the risk value after conversion. The risk value θ2/T2 is determined in consideration of the time T2 before reaching the dangerous regions DZ21, DZ22, and DZ23 in conversion of the geometrical region into the risk value. Accordingly, it is possible to reflect the time before collision avoidance in addition to the turning operation amount of the vessel 1 (own vessel), on the risk value. The minimum turning angle θ2 is normalized as a maximum of 180°. With this method, even when the positional relationship between the vessel 1 (own vessel) and the dangerous region is the same, for example, it is possible to have a feature in determination that the higher the velocity, the higher the risk. The minimum turning angle θ2 and the velocity of the vessel 1 (own vessel) at each of times are an example of the maneuvering amount. Note that in FIG. 10, the minimum turning angle θ2 is a right turning angle, but may be a left turning angle, or either one angle being a minimum angle among the right turning angle and the left turning angle.

<Third Conversion Method>

Figure 11:
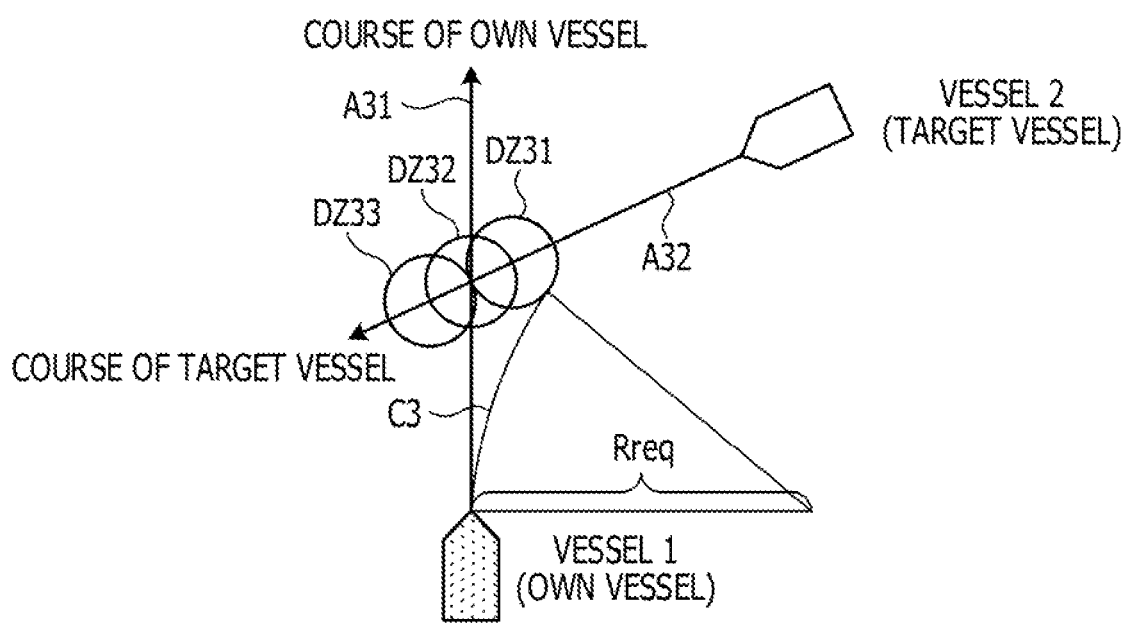
FIG. 11 is a view illustrating a third conversion method of the region-type risk value in OZT according to an embodiment.
Figure 12:
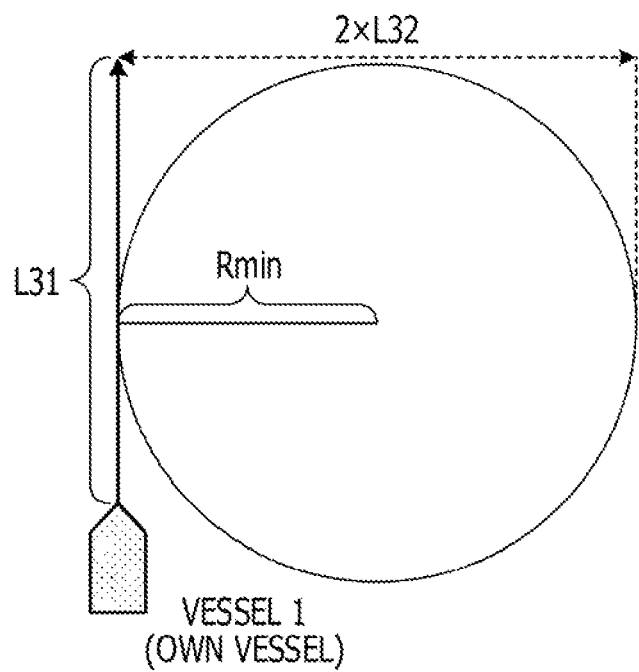
FIG. 12 is a view illustrating the third conversion method of the region-type risk value in OZT according to an embodiment.

FIGS. 11 and 12 are views illustrating a third conversion method of the region-type risk value in an OZT according to an embodiment. The risk calculation unit 44 creates an estimated future route of the vessel 1 (own vessel) at each of times, as indicated by a velocity vector A31 in FIG. 11. Similarly, the risk calculation unit 44 creates an estimated future route of the vessel 2 (target vessel), as indicated by a velocity vector A32 in FIG. 11. Subsequently, the risk calculation unit 44 calculates a radius of a circle C3 that comes in contact with both a straight line of the course of the vessel 1 (own vessel) illustrated in a velocity vector A31 in FIG. 11 and the dangerous region as a minimum turning radius Rreq in turning operation of the vessel 1 (own vessel) at maneuvering for avoiding the dangerous regions DZ31 to DZ33. In addition, the risk calculation unit 44 calculates a longitudinal distance L31 and a turning zone (2×L32) in a maximum steering angle turning test, and defines L32 which is the radius of the turning zone (2×L32) as a turning radius Rmin of the vessel 1 (own vessel). Here, the longitudinal distance L31 is 4.5 times or less of the vessel length of the vessel 1 (own vessel), for example. In addition, the turning zone (2×L32) is 4.5 times or less of the vessel length of the vessel 1 (own vessel), for example. The turning radius Rmin conforms to the International Maritime Organization (IMO) standard (2002), for example. In the third conversion method, a risk value Rreq/Rmin obtained by dividing the minimum turning radius Rreq of the vessel 1 (own vessel) by the turning radius Rmin is the risk value after conversion. Note that the risk value Rreq/Rmin is normalized to be the maximum value of the risk value when the minimum turning radius Rreq is the turning radius Rmin or more. The minimum turning angle θ2 and the velocity of the vessel 1 (own vessel) at each of times are an example of the maneuvering amount. Note that in FIG. 11, the minimum turning radius Rreq is a right turning angle, but the angle may be a left turning angle, or either one angle being a minimum angle among the right turning angle and the left turning angle.

The control unit 40 is a device that controls the collision risk calculation device 20. Examples of the control unit 40 can be a processing device such as a central processing unit (CPU) or a micro processing unit (MPU), or can be an integrated circuit such as an application specific integrated circuit (ASIC) or a field programmable gate array (FPGA). The control unit 40 includes an internal memory for storing a program and control data prescribing various processing procedures and executes various processing by using the stored program and data. Operation of various programs allows the control unit 40 to function as various processing units. For example, the control unit 40 includes an acquisition unit 41, a past track information calculation unit 42, a dangerous region information calculation unit 43, a risk calculation unit 44, and an output unit 45.

The acquisition unit 41 acquires various types of information. For example, the acquisition unit 41 acquires travel information regarding the position and velocity of each of vessels. For example, the acquisition unit 41 acquires AIS information as travel information of each of the vessels 11, from each of the vessels via the wireless communication device 13A. The acquisition unit 41 stores the acquired AIS information in the AIS accumulated data 31. In addition, the velocity of each of vessels may use the velocity stored in AIS information, and may be calculated from the positional change at each of times of each of vessels. The present embodiment describes a case where AIS information is received by the collision risk calculation device 20. Alternatively, the AIS information may be stored in an external storage device such as a storage device. In this case, the acquisition unit 41 acquires the AIS information of each of the vessels 11 from an external storage device.

Figure 5:
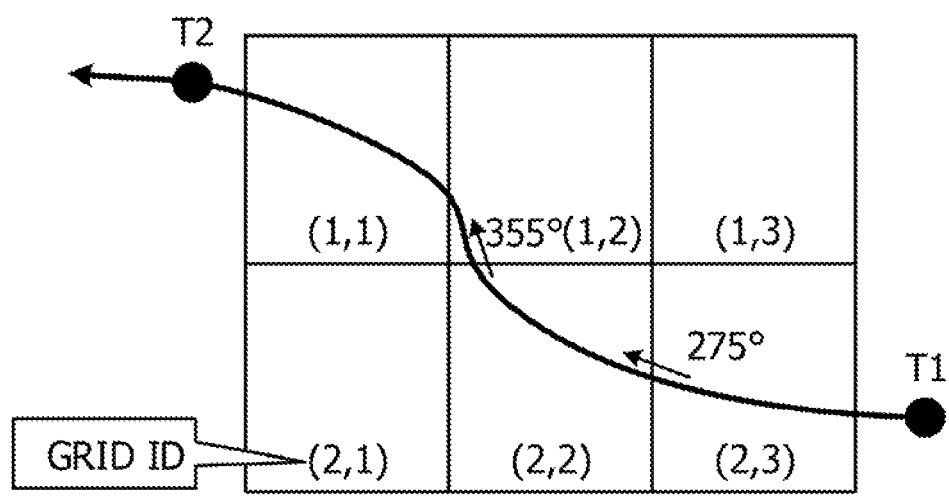
FIG. 5 is a view illustrating an example of an approach angle and an exit angle for each of grids according to an embodiment.

The past track information calculation unit 42 calculates, for each of grids, information indicating characteristics of the navigation of the vessel that has passed through the grid. For example, the past track information calculation unit 42 obtains, for each of grids, the traveling direction of each of the vessels that have passed through the grid, on the basis of the AIS accumulated data 31. FIG. 5 is a view illustrating an example of an approach angle and an exit angle for each of grids according to an embodiment. For example, the past track information calculation unit 42 refers to the AIS accumulated data 31, and as illustrated in FIG. 5 obtains the position, at each of times, of each of vessels that have passed through the grid for each of grids, and then, calculates an approach angle of each of the vessels to the grid as the traveling direction. In addition, the past track information calculation unit 42 refers to the AIS accumulated data 31 to determine, for each of grids, the velocity of each of the vessels that have passed through the grid. The velocity may be an average velocity at the time of passing through the grid or may be a velocity at the time of entering the grid.

Note that when the AIS information is transmitted from each of vessels in mutually different periods, the past track information calculation unit 42 may obtain the position and velocity of each of times by interpolation using the position and velocity of the AIS information for each of vessels. For example, the past track information calculation unit 42 calculates, for each of vessels, the position and the velocity of each of times complemented at one second intervals (or updated every one second). The past track information calculation unit 42 then stores the calculated position and velocity of each of vessels 11 at each of times in association with ID (for example, MMSI or the like) of each of the vessels in the past track information 33 illustrated in FIG. 4.

The dangerous region information calculation unit 43 calculates a region that includes, for example, the positions of the vessel 1 and the vessel 2 at each of times during navigation within the navigation control target sea area and that has a possibility, which is higher than a predetermined value, of collision, after passage of a predetermined time, of the vessel 1 and the vessel 2 when the two vessels keep the course and velocity at each of times. The dangerous region information calculation unit 43 represents the region in which a possibility of collision between the two vessels after passage of a predetermined time is higher than a predetermined value using a circle having a "circle radius (m)" centered on a "circle center point (latitude)" and a "circle center point (longitude)". The dangerous region information calculation unit 43 generates the dangerous region information 34 based on the OZT illustrated in FIG. 6, on the basis of the AIS accumulated data 31. Furthermore, the dangerous region information calculation unit 43 visually displays the OZT as illustrated in FIG. 7 via the display unit 23 on the basis of the dangerous region information 34.

The risk calculation unit 44 acquires "information regarding the vessel 1" and "Information regarding the vessel 2" from the AIS accumulated data 31. Subsequently, the risk calculation unit 44 calculates one or more "risk values 1" numerically represented, and "risk value 2" obtained by converting one or more risk values geometrically represented into numerical values. The risk calculation unit 44 then calculates the "total risk value" by weighting the "risk value 1" and the "risk value 2".

The output unit 45 performs various types of outputs. For example, the output unit 45 outputs a warning when the collision risk calculated by the risk calculation unit 44 is a threshold or higher. For example, the output unit 45 outputs a message indicating high risk of collision to a screen, the AIS device 12 of the vessel 11 having a high risk of collision, and an external device. This enables the output unit 45 to notify that the high risk of collision.

<Past Track Information Tabulation Processing>

Figure 13:
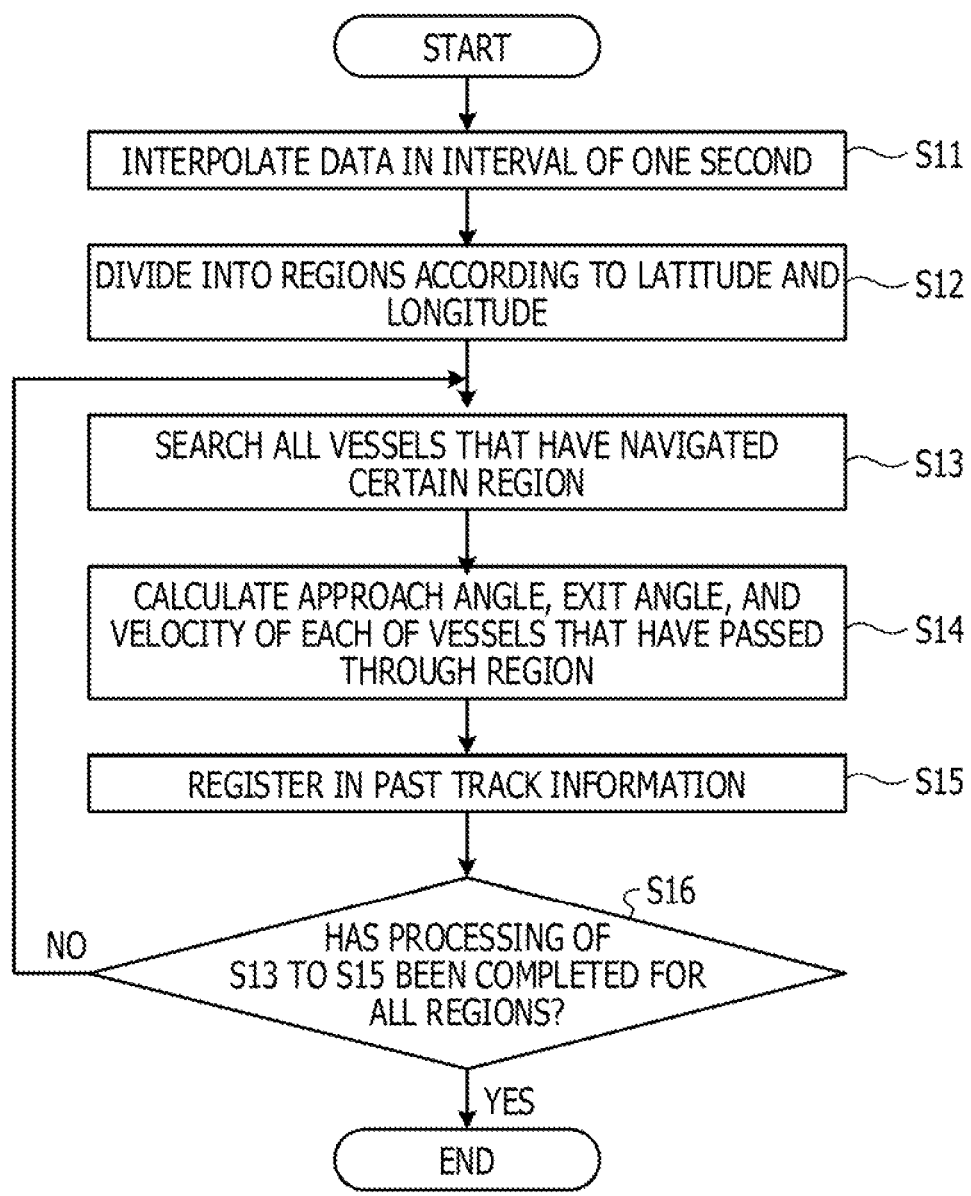
FIG. 13 is a flowchart illustrating an example of past track information tabulation processing according to an embodiment.

FIG. 13 is a flowchart of an example of a past track information tabulation processing according to an embodiment. The past track information tabulation processing is executed at a predetermined timing, for example, a timing before collision risk calculation processing described below, or a timing at which predetermined operation instructing the start of the processing is received.

As illustrated in FIG. 13, the past track information calculation unit 42 calculates, in step S11, the position and velocity of each of times on the basis of the AIS accumulated data 31, every second by interpolation or the like for each of vessels. In step S12, the past track information calculation unit 42 divides the sea area targeted for navigation control of the land facility 13 into regions (for example, grids) corresponding to the latitude and the longitude.

In step S13, the past track information calculation unit 42 searches all vessels that have navigated a certain region. In step S14, the past track information calculation unit 42 calculates the approach angle, exit angle, and the velocity of each of vessels that have passed through the region. In step S15, the past track information calculation unit 42 stores, in the past track information 33, the approach angle, exit angle, and the velocity of each of vessels for each of the regions. In step S16, the past track information calculation unit 42 determines whether or not the processing in step S13 to step S15 has been completed for all the regions. When the processing of step S13 to step S15 is completed for all the regions (step S16 Yes), the past track information calculation unit 42 finishes the past track information tabulation processing. In contrast, when the processing of step S13 to step S15 is not completed for all the regions (step S16 No), the past track information calculation unit 42 moves to the processing of step S13.

<Collision Risk Calculation Processing>

Figure 14:
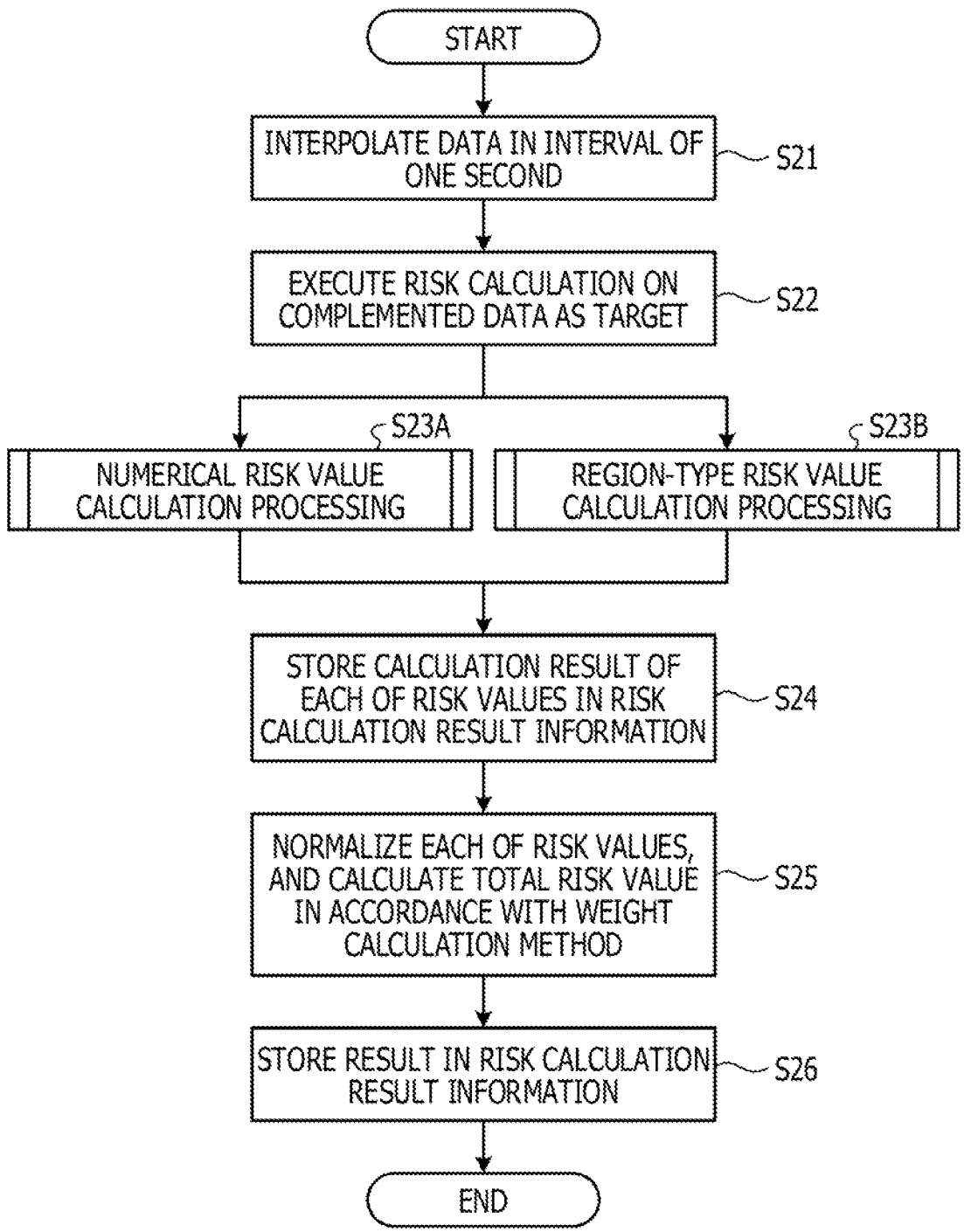
FIG. 14 is a flowchart illustrating an example of collision risk calculation processing according to an embodiment.

FIG. 14 is a flowchart illustrating an example of collision risk calculation processing according to an embodiment. The collision risk calculation processing is executed at a predetermined timing, for example, in a predetermined period or a timing at which predetermined operation instructing the start of the processing is received.

As illustrated in FIG. 14, the risk calculation unit 44 calculates, in step S21, the position and velocity of each of times on the basis of the AIS accumulated data 31, every second by interpolation or the like for each of vessels. In step S22, the risk calculation unit 44 executes risk calculation on the data that has been complemented by the processing of step S22. Specifically, in step S23A following step S22, the risk calculation unit 44 calls a numerical risk value calculation module for calculating a numerical risk value that can be expressed in a continuous or discrete numerical format, and executes numerical risk value calculation processing. Furthermore, in step S23B following step S22, the risk calculation unit 44 calls a region-type risk value calculation module for calculating a region-type risk value that can be expressed in a geometric form, and executes region-type risk value calculation processing.

Note that for simplification of description, the flowchart of the collision risk value calculation processing illustrated in FIG. 14 includes only one step of step S23A as the calling step of the numerical risk value calculation module for calculating a numerical risk value, being a case where one type of risk value is calculated. When a plurality of types of numerical risk values are calculated, the numerical risk value calculation modules for each of numerical risk values are called in parallel and executed. Similarly, the flowchart of the collision risk value calculation processing illustrated in FIG. 14 includes only one step of step S23B as the calling step of the region-type risk value calculation module for calculating a region-type risk value, being a case where one type of region-type risk value is calculated. When a plurality of types of region-type risk values are calculated, the region-type risk value calculation modules for each of region-type risk values are called in parallel and executed.

In step S23A, the risk calculation unit 44 calls a numerical risk value calculation module for calculating a numerical risk value to be calculated as a subroutine and calculates a numerical risk value to be calculated. The details of step S23A will be described below with reference to FIG. 15.

Meanwhile, in step S23B, the risk calculation unit 44 calls a region-type risk value calculation module for calculating a region-type risk value to be calculated as a subroutine and calculates a region-type risk value to be calculated. The details of step S23B will be described below with reference to FIG. 16.

In step S24 following step S23A and step S23B, the risk calculation unit 44 sets the numerical risk value calculation result obtained in step S23A as "risk value 1" and sets the region-type risk value calculation result obtained in step S23B as "risk value 2". Subsequently, the risk calculation unit 44 stores the obtained results in the risk calculation result information 35 together with "the information regarding the vessel 1" and the "information regarding the vessel 2" used as the basis of calculation. Note that when a plurality of types of numerical risk values are calculated, "risk value 1" is calculated for each of the numerical risk values. When a plurality of types of region-type risk values are calculated, "risk value 2" is calculated for each of the region-type risk values. The calculated values are stored in the risk calculation result information 35.

In step S25, the risk calculation unit 44 normalizes "risk value 1" and "risk value 2" stored in the risk calculation result information 35 in step S24, and calculates the "total risk value" from the "risk value 1" and the "risk value 2" in accordance with the weight calculation method. For example, the risk calculation unit 44 normalizes each of the "risk value 1" and the "risk value 2" so as to make them fall within a value range of 0 or more and 1 or less, and calculates the average of the "risk value 1" and the "risk value 2" as the "total risk value".

In step S26, the risk calculation unit 44 stores the "total risk value" calculated in step S25 in the risk calculation result information 35. After completion of step S26, the risk calculation unit 44 finishes the collision risk calculation processing.

<Numerical Risk Value Calculation Processing>

Figure 15:
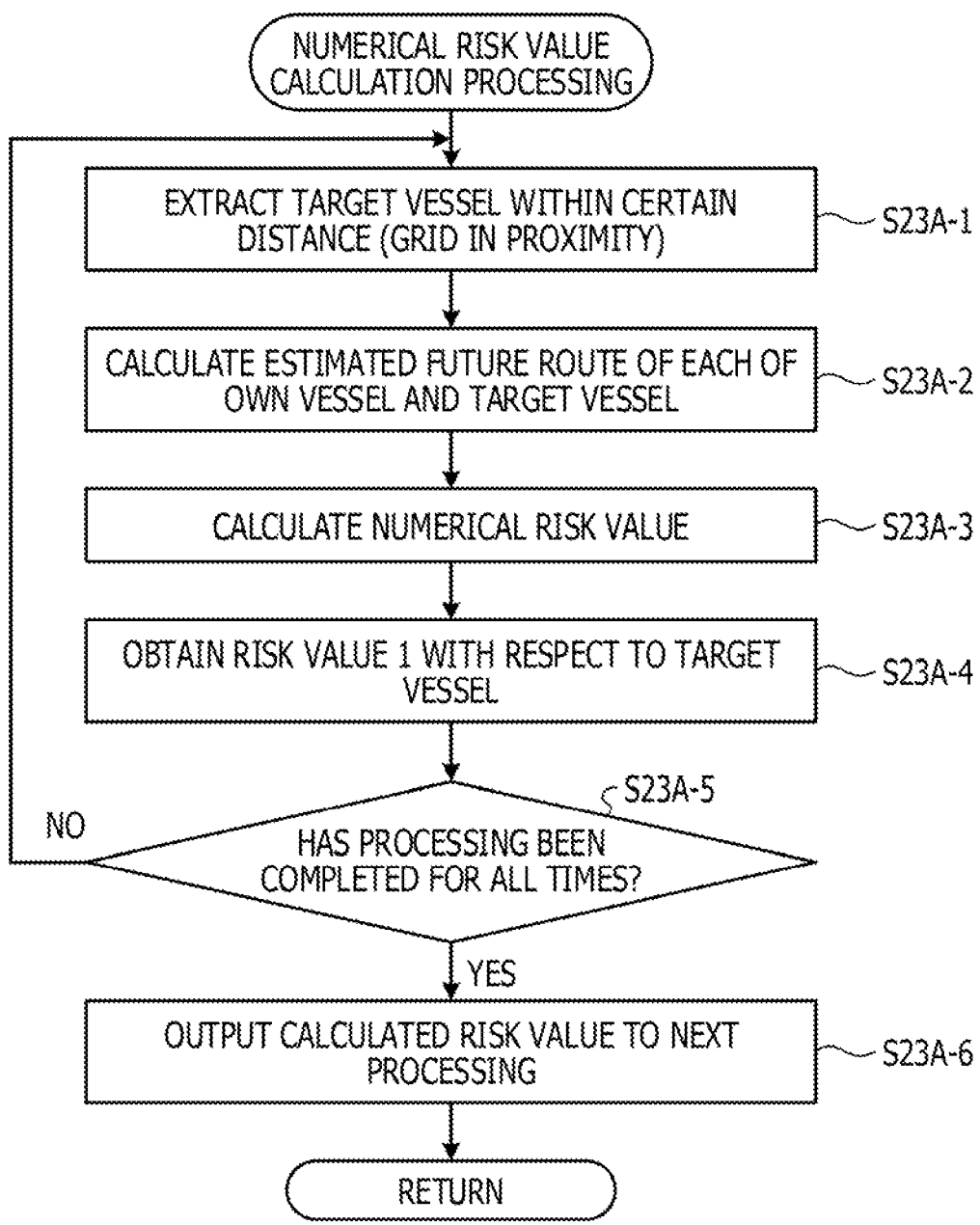
FIG. 15 is a diagram illustrating a subroutine of an example of numerical risk value calculation processing according to an embodiment.

FIG. 15 is a diagram illustrating a subroutine of an example of numerical risk value calculation processing according to an embodiment. FIG. 15 illustrates processing executed by the risk calculation unit 44 in the processing of step S23A of the collision risk calculation processing illustrated in FIG. 14, specifically, processing of calling and executing the numerical risk value calculation module corresponding to the numerical risk value to be calculated and then calculating the "risk value 1".

As illustrated in FIG. 15, in step S23A-1, the risk calculation unit 44 extracts the vessel 2 (target vessel) within a certain distance (for example, a grid in a predetermined level of proximity) with respect to the vessel 1 (own vessel) as illustrated in FIG. 1, for example. The risk calculation unit 44 calculates, in step S23A-2, an estimated future route of each of the vessel 1 (own vessel) and vessel 2 (target vessel) extracted in S23A-1 by a prediction method based on the information accumulated in the past track information 33. For example, a plurality of predicted future routes is conceivable at the time of predicting the course and velocity of a vessel. In this case, the course and the velocity as a sum obtained by weighting each of the courses and the velocities by the probability of occurrence of each for the possible courses of the vessel are to be used as a possible predicted future route of the vessel.

In step S23A-3, the risk calculation unit 44 calculates a numerical risk value to be calculated from the predicted future routes calculated in step S23A-2, on the basis of the defined calculation formula of the numerical risk value. Specifically, when the numerical risk value to be calculated is DCPA indicating a risk value between the vessel 1 (own vessel) and the vessel 2 (target vessel), for example, the risk calculation unit 44 calculates the DCPA on the basis of a formula that defines the DCPA of the vessel 2 (target vessel) with respect to the vessel 1 (the own vessel). In step S23A-4, the risk calculation unit 44 obtains the numerical risk value calculated in step S23A-3 as the "risk value 1" of the vessel 2 (target vessel) with respect to the vessel 1 (own vessel).

In step S23A-5, the risk calculation unit 44 determines whether or not the processing in steps S23A-1 to 23A-4 has been completed for all the times in a target period for which "risk value 1" is calculated. When the processing of steps S23A-1 to 23A-4 is completed for all the times in the target period for which the "risk value 1" is calculated (step S23A-5 Yes), the risk calculation unit 44 moves to the processing of step S23A-6. In contrast, when the processing of steps S23A-1 to 23A-4 is not completed for all the times of the target period for which "risk value 1" is calculated (step S23A-5 No), the risk calculation unit 44 moves to the processing of step S23A-1.

In step S23A-6, the risk calculation unit 44 outputs the "risk value 1" calculated by repeating a series of processing in steps S23A-1 to 23A-4 to the processing of the next step S24. After completion of step S23A-6, the risk calculation unit 44 finishes the numerical risk value calculation processing.

Note that although the risk calculation unit 44 calculates, in the numerical risk value calculation processing described above, the "risk value 1" using the predicted future routes calculated by weighting the plurality of predicted future routes with probability, the calculation processing is not limited to this method. That is, the risk calculation unit 44 may calculate the "risk value 1" for each of the plurality of predicted future routes, weight each of the plurality of predicted future routes with each of probabilities to calculate the "risk value 1". This makes it possible to calculate risk values with higher flexibility.

Furthermore, in the processing of step S23A-2, the risk calculation unit 44 may calculate the estimated future routes of the vessel 1 (own vessel) and the vessel 2 (target vessel) extracted in step S23A-1 by a prediction method not based on the information accumulated in the past track information 33. In this case, it is possible to omit the past track information calculation unit 42 illustrated in FIG. 2, the past track information 33 illustrated in FIG. 4, and the past track information tabulation processing illustrated in FIG. 13.

<Region-Type Risk Value Calculation Processing>

Figure 16:
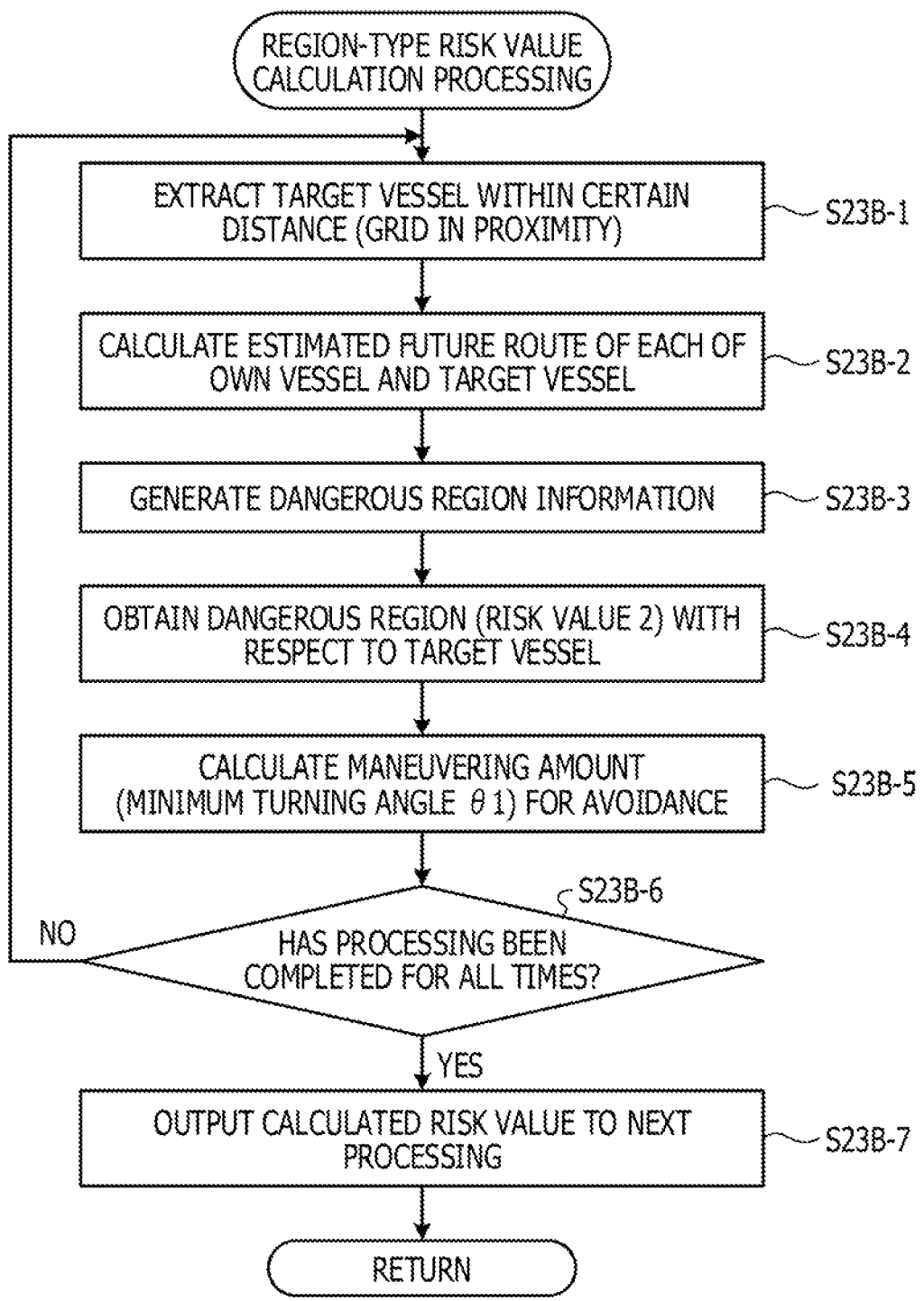
FIG. 16 is a diagram illustrating a subroutine of an example of region-type risk value calculation processing according to an embodiment.

FIG. 16 is a diagram illustrating a subroutine of an example of region-type risk value calculation processing according to an embodiment. FIG. 16 illustrates processing executed by the risk calculation unit 44 in the processing of step S23B of the collision risk calculation processing illustrated in FIG. 14, specifically, processing of calling and executing the region-type risk value calculation module corresponding to the region-type risk value to be calculated and then calculating the "risk value 2".

As illustrated in FIG. 16, in step S23B-1, the risk calculation unit 44 extracts the vessel 2 (target vessel) within a certain distance (for example, a grid in a predetermined level of proximity) with respect to the vessel 1 (own vessel) as illustrated in FIG. 1, for example. The risk calculation unit 44 calculates, in step S23B-2, an estimated future route of each of the extracted vessel 1 (own vessel) and vessel 2 (target vessel) extracted in S23B-1 by a prediction method based on the information accumulated in the past track information 33. The method of calculating the estimated future route is similar to the numerical risk value calculation processing illustrated in FIG. 15.

In step S23B-3, the risk calculation unit 44 generates, by the dangerous region information calculation unit 43, the dangerous region information 34 (refer to FIG. 6) from the predicted future routes calculated in step S23B-2 on the basis of the defined calculation formula of the dangerous region (OZT). Specifically, when the region-type risk value to be calculated is the region-type risk value (OZT), the risk calculation unit 44 calculates, by the dangerous region information calculation unit 43, an OZT of each of the vessel 1 (own vessel) and the vessel 2 (target vessel) on the basis of the definition of OZT. In step S23B-4, the risk calculation unit 44 obtains the OZT calculated in step S23B-3 as a dangerous region ("risk value 2") of the vessel 1 (own vessel) and the vessel 2 (target vessel).

In step S23B-S, in order to convert the dangerous region being the region-type risk value into the numerical risk value, for example, the minimum turning angle θ1 is calculated by the above-described "first conversion method".

In step S23B-6, the risk calculation unit 44 determines whether or not the processing in steps S23B-1 to 23B-5 has been completed for all the times in a target period for which "risk value 2" is calculated. When the processing of steps S23B-1 to 23B-5 is completed for all times in the target period for which the "risk value 2" is calculated (step S23B-6 Yes), the risk calculation unit 44 moves to the processing of step S23B-7. In contrast, when the processing of steps S23B-1 to 23B-5 is not completed for all the times of the target period for which the "risk value 2" is calculated (step S23B-6 No), the risk calculation unit 44 moves to the processing of step S23B-1.

In step S23B-7, the risk calculation unit 44 outputs the "risk value 2" calculated by repeating a series of processing in steps S23B-1 to 23B-5 to the processing of the next step S24. After completion of step S23B-7, the risk calculation unit 44 finishes the region-type risk value calculation processing.

Note that although the risk calculation unit 44 calculates, in the region-type risk value calculation processing described above, the "risk value 2" using the predicted future routes calculated by weighting the plurality of predicted future routes with probability, the calculation processing is not limited to this method. That is, the risk calculation unit 44 may calculate the "risk value 2" for each of the plurality of predicted future routes, and weight each of the plurality of predicted future routes with each of probabilities to calculate the "risk value 2". This makes it possible to calculate risk values with higher flexibility.

Furthermore, in the processing of step S23B-2, the risk calculation unit 44 may calculate the estimated future routes of the vessel 1 (own vessel) and the vessel 2 (target vessel) extracted in step S23B-1 by a prediction method not based on the information accumulated in the past track information 33. In this case, similarly to the numerical risk value calculation processing, it is possible to omit the past track information calculation unit 42 illustrated in FIG. 2, the past track information 33 illustrated in FIG. 4, and the past track information tabulation processing illustrated in FIG. 13.

Since various collision risk values have various definitions for each of collision risks, there are cases where one collision risk value indicates a high collision risk while another collision risk value indicates a low collision risk even when the values are based on the same AIS data. To overcome this, there is a conceivable method of appropriately weight various collision risks to achieve a new collision risk calculation method capable of achieving higher accuracy than calculating a single collision risk based on a single method.

While it is possible to weight a plurality of types of collision risks as long as the both are the collision risks expressed in numerical form, weighting would be difficult between the collision risk expressed in a numerical form and the collision risk expressed in the form of geometrical region (for example, a dangerous region having a risk of collision). In this manner, there is a problem that it is difficult to calculate a collision risk when collision risks having different formats are involved.

To overcome this, the collision risk calculation device 20 in the above-described embodiment converts the region-type risk value into a numerical value. In addition, the collision risk calculation device 20 in the above-described embodiment calculates a total risk value obtained by weighting the numerical risk value and the risk value obtained by converting the region-type risk value into the numerical value, and uses this total risk value to represent the collision risk between vessels. Accordingly, this makes it possible, by the above-described embodiment, to quantitatively grasp the collision risk represented as a geometrical region. In addition, according to the above-described embodiment, the total risk value having each of the features of various numerical risk values and region-type risk values is used. This makes it possible to represent the risk of vessel collision with higher accuracy while achieving a property that "the risk is maximized immediately before collision" as the property that the collision risk value should have.

Furthermore, in the above-described embodiment, a plurality of future paths of each of the vessel 1 and the vessel 2 is calculated, and a plurality of future paths is weighted by each of occurrence probabilities to calculate a future path of each of the vessel 1 and the vessel 2. This makes it possible to improve the prediction accuracy of the future path of each of the vessel 1 and the vessel 2 and to improve the accuracy of the numerical risk value, the region-type risk value, and the total risk value.

Furthermore, in the above-described embodiment, the region-type risk value is converted into a value based on the turning angle taken by the vessel 1 or vessel 2 in order to avoid a dangerous region. Accordingly, the closer the other vessel moves toward the own vessel, the larger the value based on the turning angle, that is, the larger the value after conversion of the region-type risk value becomes. This makes it possible to more appropriately express the degree of risk in the region-type risk value.

In addition, when the collision risk calculation device 20 in the above-described embodiment uses a collision risk visualization result of the vessel in a marine traffic control system or the like, the collision risk calculation device 20 displays a realtime position of the vessel on a map and displays predicted future routes to be used by each of the vessels or a graph of collision risk for each of vessels. Therefore, according to the above-described embodiment, at the time of occurrence of a vessel having a high collision risk, it is possible to issue an alarm or highlight the corresponding vessel on a display screen so as to enable the operator to confirm the vessel on the display unit 23 or the like, and enable notifying the vessel 11 of the collision risk as needed.

Other Embodiments

Although embodiments of the disclosed technology have been described above, the disclosed technology may be implemented in various forms in addition to the above embodiments. Thus, hereinafter, other embodiments included in the disclosed technology will be described.

<1: Dangerous Regions>

Figure 17:
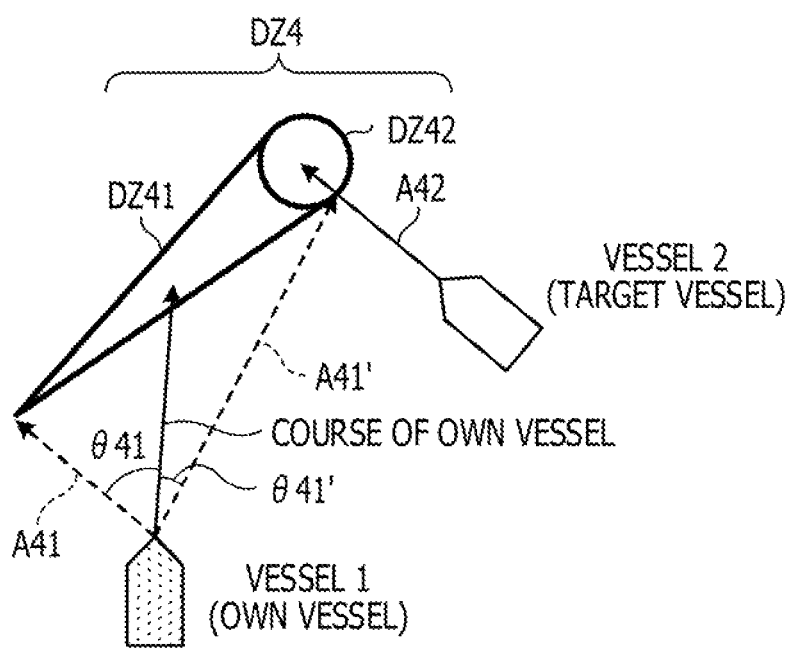
FIG. 17 is a view illustrating a method of converting a region-type risk value in CDL according to an embodiment.
Figure 18:
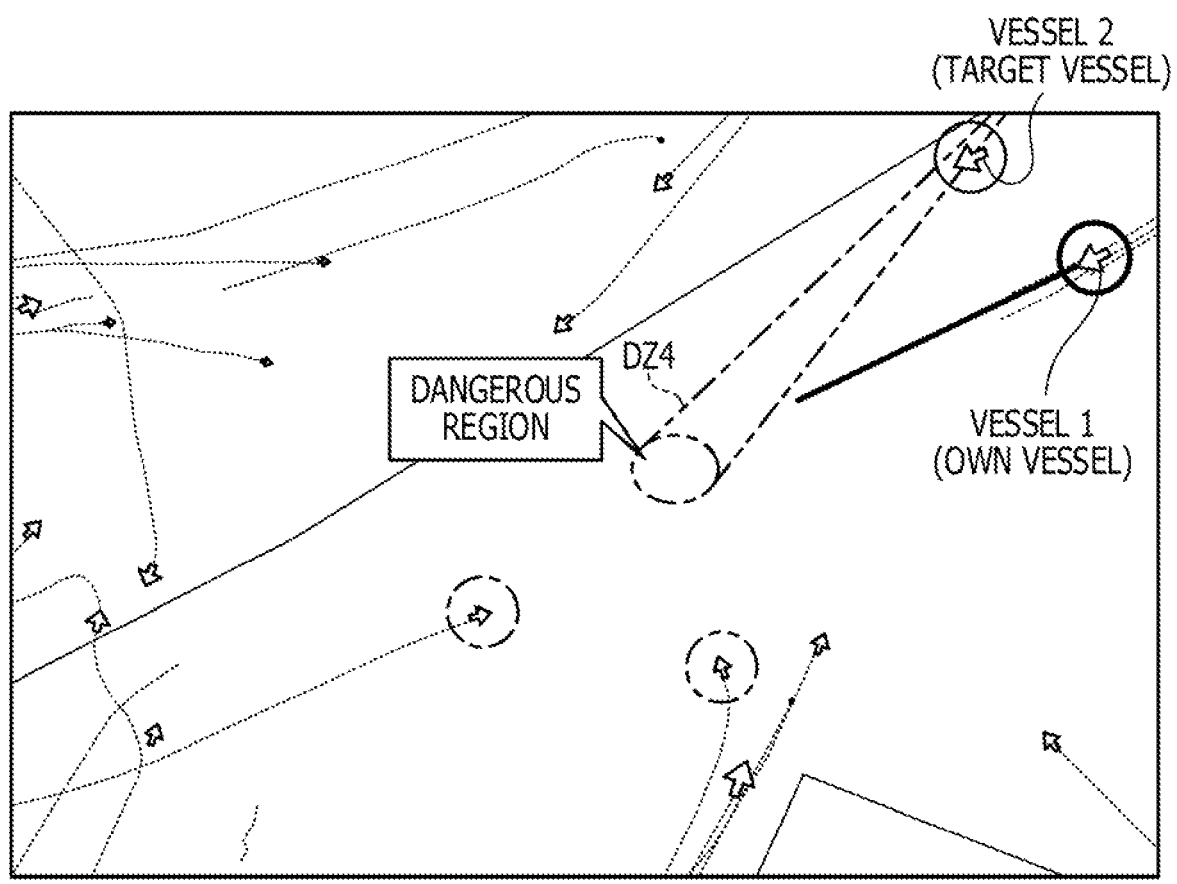
FIG. 18 is a view illustrating an example of display of the CDL according to an embodiment.

Although the dangerous region is represented by the OZT in the above-described embodiment, it is not limited to this and may be represented by the Collision Danger Line (CDL). FIG. 17 is a view illustrating a method of converting a region-type risk value in CDL according to an embodiment. FIG. 18 is a view illustrating an example of display of the CDL according to an embodiment.

When the vessel 2 reaches a region DZ42 using a course of a velocity vector A42 within N minutes, the vessel 1 would take a course starting from a velocity vector A41 parallel to the velocity vector A42 and having the same size as the velocity vector A42 (left turning angle θ41 from the course of the vessel 1) up to a velocity vector A41' (right turning angle θ41' from the course of the vessel 1). By using this course, it is considered that the vessel 1 (own vessel)

does not enter a dangerous region DZ4, with the distance between the vessel 1 (own vessel) and the vessel 2 (target vessel) larger than a threshold within N minutes, making it possible to ensure navigation safety. This dangerous region DZ4 corresponds to the CDL. In addition, the CDL is used as a method for defining a region DZ41 and a region DZ42 where the navigation safety is not ensured due to the distance between the vessel 1 (own vessel) and the vessel 2 (target vessel) being the threshold or less within N minutes as the dangerous region DZ4 where a tip of the velocity vector A41 of the vessel 1 (own vessel) should not be allowed to enter. Note that as illustrated in FIG. 17, the dangerous region DZ4 is formed of a circle and two tangents in contact with the circle.

For example, as illustrated in FIG. 18, the dangerous region DZ4 is a region in which the distance between the vessel 1 (own vessel) and the vessel 2 (target vessel) falls to the threshold or below within N minutes when each of the vessel 1 (own vessel) and the vessel 2 (target vessel) continues taking the current course and velocity.

Note that the technology is not limited to OZT and CDL, and the disclosed technology can be applicable to any collision risk value as long as the value is the collision risk value represented in the form of geometrical region (for example, a dangerous region having a risk of collision).

<2: Time>

In the above embodiment, the time indicating the dangerous region is a point after a predetermined time, for example, five minutes, from the current time. However, the disclosed technology is not limited to this, and the time indicating the dangerous region may be the current time.

<3: Arrangement of Collision Risk Calculation Device 20>

In the above-described embodiment, the collision risk calculation device 20 is mounted in a computer device such as a server disposed in the land facility 13. However, the disclosed technology is not limited to this, and the collision risk calculation device 20 may be directly mounted on the vessel 11 for the purpose of preventing the collision of the vessel 11.

<4: Analysis of Past Cases>

In the above-described embodiment, the collision risk calculation device 20 calculates and displays an inter-vessel collision risk value after a predetermined time from the current time. The disclosed technology is not limited to this, and the collision risk calculation device 20 may extract, from the past data, dangerous cases that did not lead to an accident. This enables the collision risk calculation device 20 to support analysis of past cases and creation of dangerous spot maps, leading to contribution to prevention of vessel collision accidents.

In addition, each component of each device illustrated in the drawings is functionally conceptual, and thus the devices do not have to be physically configured as illustrated in the drawings. That is, the specific states of separation and integration of each of the apparatus and devices are not limited to the illustrated aspects, and all or part of the apparatus or devices can be functionally or physically separated and integrated in any unit, in accordance with various loads, use status, and the like. For example, the dangerous region information calculation unit 43 and the risk calculation unit 44 may be integrated to each other. Alternatively, for example, the dangerous region information calculation unit 43 may be dispersed into an estimated future path calculation unit that calculates an estimated future path of the vessel 1 (own vessel) and the vessel 2 (target vessel), and a dangerous region information calculation unit that calculates dangerous region information. The risk calculation unit 44 may be dispersed into a future path calculation unit and a risk calculation unit.

All or any part of each processing function performed by each device may be realized by a CPU and a program analyzed and executed by the CPU, or may be realized as hardware using wired logic.

<Collision Risk Calculation Program>

Figure 19:
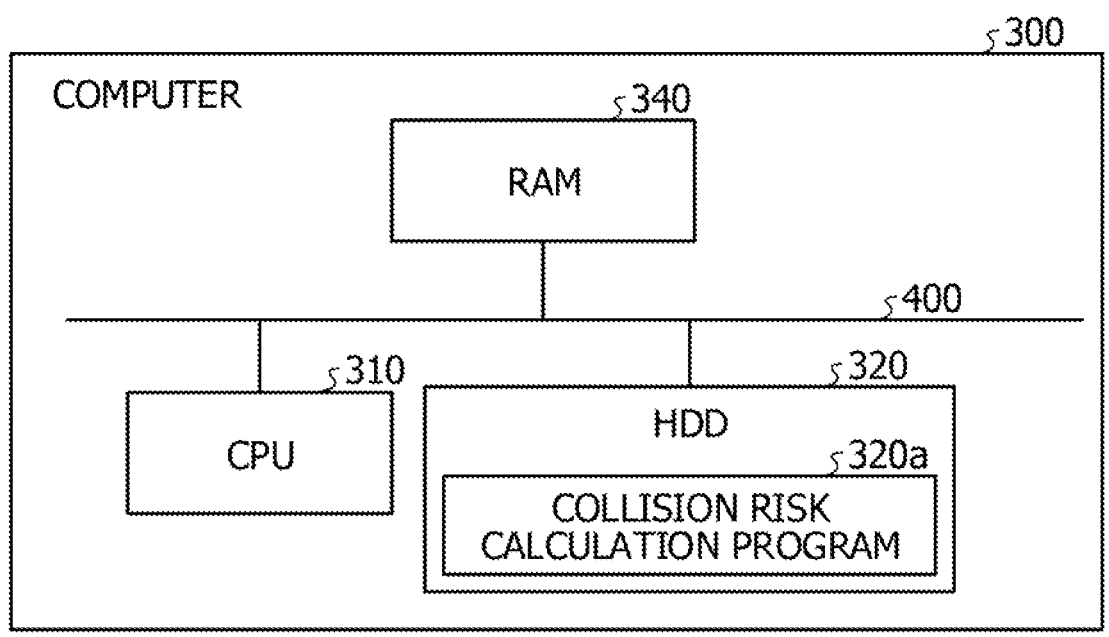
FIG. 19 is a diagram illustrating a computer that executes a collision risk calculation program.

Various types of processes described in the above embodiments can also be implemented by executing a program prepared in advance on a computer system such as a personal computer or a work station. Accordingly, the following will describe an example of the computer system that executes a program having functions similar to the above embodiments. FIG. 19 is a diagram illustrating a computer that executes a collision risk calculation program.

As illustrated in FIG. 19, a computer 300 includes a CPU 310, a hard disk drive (HDD) 320, and a random access memory (RAM) 340. The components 310 to 340 are each connected via a bus 400.

The HDD 320 preliminarily stores a collision risk calculation program 320a having the function similar to each of processing units of the above-described embodiments. For example, the HDD 320 sores the collision risk calculation program 320a having a function similar to the acquisition unit 41, the past track information calculation unit 42, the dangerous region information calculation unit 43, the risk calculation unit 44, and the output unit 45 of the above embodiment. Note that each of the functions of the collision risk calculation program 320a may be divided into modules as appropriate.

The HDD 320 also stores various data. For example, the HDD 320 stores the OS and various data.

The CPU 310 reads the collision risk calculation program 320a from the HDD 320 and executes the program to execute operation similar to operation of each of the processing units of the embodiment. That is, the collision risk calculation program 320a executes operation similar to operation performed by the acquisition unit 41, the past track information calculation unit 42, the dangerous region information calculation unit 43, the risk calculation unit 44, and the output unit 45 in the embodiment.

Note that the above-described collision risk calculation program 320a does not necessarily have to be stored in the HDD 320 from the beginning. For example, the program may be preliminarily stored in a "portable physical medium" such as a flexible disk (FD), a compact disk read only memory (CD-ROM), a digital versatile disk (DVD), a magneto-optical disk, or an IC card to be inserted into the computer 300. The computer 300 may be configured to read the program from these media and execute the program.

Alternatively, the program may be stored in "another computer (or a server)" or the like connected to the computer 300 via a public line, the Internet, a local area network (LAN), a wide area network (WAN), or the like. The computer 300 may be configured to read the program from these media and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a collision risk calculation program configured to cause a processor to perform processing, the processing comprising:
executing acquisition processing that includes acquiring travel information regarding a position and velocity of each of a first vessel and a second vessel;
executing region calculation processing that includes calculating a region having a possibility of future collision between the first vessel and the second vessel from the travel information of each of the first vessel and the second vessel; and
executing, for at least any one of the first vessel or the second vessel, first risk calculation processing that includes
estimating a maneuvering amount to be used by that vessel on water, the maneuvering amount being a minimum turning radius required for that vessel to avoid the region, and
calculating a first risk value by dividing the minimum turning radius as the estimated maneuvering amount for that vessel on water by a turning radius of a predetermined turning zone for that vessel on water.

2. The non-transitory computer-readable storage medium according to claim 1,
wherein the processing comprises:
executing second risk calculation processing that includes calculating a second risk value that numerically indicates a possibility of future collision between the first vessel and the second vessel; and
executing third risk calculation processing that includes calculating a third risk value that indicates a possibility of future collision between the first vessel and the second vessel by weighting the first risk value and the second risk value.

3. The non-transitory computer-readable storage medium according to claim 2,
wherein the second risk calculation processing is configured to
calculate a plurality of future paths of each of the first vessel and the second vessel from travel information of vessels that have navigated in the past to calculate a future path of each of the first vessel and the second vessel by weighting the plurality of future paths with probability of occurrence of each, and
calculate the first risk value or the second risk value on the basis of the future path.

4. The non-transitory computer-readable storage medium according to claim 1,
wherein the first risk value is determined based on a minimum turning angle taken by the first vessel or the second vessel in order to avoid the region.

5. The non-transitory computer-readable storage medium according to claim 1,
wherein the first risk value is determined based on a value obtained by dividing a minimum turning angle taken by the first vessel or the second vessel in order to avoid the region by a time taken for the first vessel or the second vessel that takes the minimum turning angle to reach the region.

6. A apparatus for a collision risk calculation, the apparatus comprising:
a memory; and
a processor coupled to the memory, the processor being configured to
execute acquisition processing that includes acquiring travel information regarding a position and velocity of each of a first vessel and a second vessel,
execute region calculation processing that includes calculating a region having a possibility of future collision between the first vessel and the second vessel from the travel information of each of the first vessel and the second vessel, and
execute, for at least any one of the first vessel or the second vessel, first risk calculation processing that includes
estimating a maneuvering amount to be used by that vessel on water, the maneuvering amount being a minimum turning radius required for that vessel to avoid the region, and
calculating a first risk value by dividing the minimum turning radius as the estimated maneuvering amount for that vessel on water by a turning radius of a predetermined turning zone for that vessel on water.

7. A method performed by a computer for a collision risk calculation, the method comprising:
executing acquisition processing that includes acquiring travel information regarding a position and velocity of each of a first vessel and a second vessel;
executing region calculation processing that includes calculating a region having a possibility of future collision between the first vessel and the second vessel from the travel information of each of the first vessel and the second vessel; and
executing, for at least any one of the first vessel or the second vessel, first risk calculation processing that includes
estimating a maneuvering amount to be used by that vessel on water, the maneuvering amount being a minimum turning radius required for that vessel to avoid the region, and
calculating a first risk value by dividing the minimum turning radius as the estimated maneuvering amount for that vessel on water by a turning radius of a predetermined turning zone for that vessel on water.

8. The method according to claim 7, further comprising:
executing second risk calculation processing that includes calculating a second risk value that numerically indicates a possibility of future collision between the first vessel and the second vessel; and
executing third risk calculation processing that includes calculating a third risk value that indicates a possibility of future collision between the first vessel and the second vessel by weighting the first risk value and the second risk value.

9. The method according to claim 8,
wherein the second risk calculation processing is configured to
calculate a plurality of future paths of each of the first vessel and the second vessel from travel information of vessels that have navigated in the past to calculate a future path of each of the first vessel and the second vessel by weighting the plurality of future paths with probability of occurrence of each, and
calculate the first risk value or the second risk value on the basis of the future path.

10. The method according to claim 7,
wherein the first risk value is determined based on a minimum turning angle taken by the first vessel or the second vessel in order to avoid the region.

11. The method according to claim 7,
wherein the first risk value is determined based on a value obtained by dividing a minimum turning angle taken by the first vessel or the second vessel in order to avoid the region by a time taken for the first vessel or the second vessel that takes the minimum turning angle to reach the region.

12. The apparatus according to claim 6,
wherein the first risk value is determined based on a minimum turning angle taken by the first vessel or the second vessel in order to avoid the region.

13. The apparatus according to claim 6,
wherein the first risk value is determined based on a value obtained by dividing a minimum turning angle taken by the first vessel or the second vessel in order to avoid the region by a time taken for the first vessel or the second vessel that takes the minimum turning angle to reach the region.

14. The apparatus according to claim 6,
wherein the processor is further configured to execute second risk calculation processing that includes calculating a second risk value that numerically indicates a possibility of future collision between the first vessel and the second vessel; and execute third risk calculation processing that includes calculating a third risk value that indicates a possibility of future collision between the first vessel and the second vessel by weighting the first risk value and the second risk value.

15. The apparatus according to claim 14,
wherein the second risk calculation processing is configured to calculate a plurality of future paths of each of the first vessel and the second vessel from travel information of vessels that have navigated in the past to calculate a future path of each of the first vessel and the second vessel by weighting the plurality of future paths with probability of occurrence of each, and calculate the first risk value or the second risk value on the basis of the future path.

\* \* \* \* \*